(12) United States Patent
Heidel et al.

(10) Patent No.: US 12,054,399 B2
(45) Date of Patent: *Aug. 6, 2024

(54) RECOVERING A CAUSTIC SOLUTION VIA CALCIUM CARBONATE CRYSTAL AGGREGATES

(71) Applicant: Carbon Engineering ULC, Squamish (CA)

(72) Inventors: Kenton Robert Heidel, Calgary (CA); David William Keith, Canmore (CA); Jane Anne Ritchie, Calgary (CA); Nicholas Vollendorf, New Berlin, WI (US); Eric Fessler, Brookfield, WI (US)

(73) Assignee: Carbon Engineering ULC, Squamish BC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,150

(22) Filed: Apr. 20, 2023

(65) Prior Publication Data

US 2023/0331576 A1    Oct. 19, 2023

Related U.S. Application Data

(60) Continuation of application No. 17/236,478, filed on Apr. 21, 2021, now Pat. No. 11,667,538, which is a
(Continued)

(51) Int. Cl.
*C01F 11/18* (2006.01)
*B01D 9/00* (2006.01)
*D21C 11/00* (2006.01)

(52) U.S. Cl.
CPC .......... *C01F 11/182* (2013.01); *B01D 9/0036* (2013.01); *C01F 11/181* (2013.01);
(Continued)

(58) Field of Classification Search
CPC ............. C01P 2004/61; C01P 2004/62; D21C 11/0078; B01D 9/0036; B01D 2009/086;
(Continued)

(56) References Cited

U.S. PATENT DOCUMENTS 3,150,926 A    9/1964    Pope et al.
4,668,342 A    5/1987    Blackwell
(Continued)

FOREIGN PATENT DOCUMENTS

CN    1239932    12/1999
CN    1278781    1/2001
(Continued)

OTHER PUBLICATIONS

Anwar et al., "Mode of Action and Design Rules for Additives That Modulate Crystal Nucleation," Angew. Chem. 2009, vol. 121, pp. 1624-1628.
(Continued)

*Primary Examiner* — Robert M Kunemund
(74) *Attorney, Agent, or Firm* — Fish & Richardson P.C.

(57) ABSTRACT

Techniques for growing crystalline calcium carbonate solids such that the crystalline calcium carbonate solids include a volume of 0.0005 $mm^3$ to 5 $mm^3$, include a slaker to react quicklime (CaO) and a low carbonate content fluid to yield a slurry of primarily slaked lime ($Ca(OH)_2$); a fluidized-bed reactive crystallizer that encloses a solid bed mass and includes an input for a slurry of primarily slaked lime, an input for an alkaline solution and carbonate, and an output for crystalline calcium carbonate solids that include particles and an alkaline carbonate solution; a dewatering apparatus that includes an input coupled to the crystallizer and an output to discharge a plurality of separate streams that each include a portion of the crystalline calcium carbonate solids and alkaline carbonate solution; and a seed transfer appara-
(Continued)

tus to deliver seed material into the crystallizer to maintain a consistent mass of seed material.

20 Claims, 6 Drawing Sheets

Related U.S. Application Data continuation of application No. 16/704,088, filed on Dec. 5, 2019, now Pat. No. 11,014,823, which is a continuation of application No. 15/370,620, filed on Dec. 6, 2016, now Pat. No. 10,519,041, which is a division of application No. 14/281,430, filed on May 19, 2014, now Pat. No. 9,637,393.

(52) U.S. Cl.
CPC ........ *C01F 11/183* (2013.01); *D21C 11/0078* (2013.01); *B01D 2009/0086* (2013.01); *C01P 2004/61* (2013.01); *C01P 2004/62* (2013.01); *Y02P 40/40* (2015.11)

(58) Field of Classification Search
CPC ...... Y02P 40/40; C01F 11/182; C01F 11/181; C01F 11/183
See application file for complete search history.

(56) References Cited

U.S. PATENT DOCUMENTS

| | | | |
|---|---|---|---|
| 6,761,869 B1 | 7/2004 | Virtanen | |
| 7,097,819 B2 | 8/2006 | Konno | |
| 8,728,428 B1* | 5/2014 | Heidel | B01J 6/001 |
| | | | 423/432 |
| 8,845,906 B2 | 9/2014 | Henley | |
| 9,637,393 B2 | 5/2017 | Heidel | |
| 9,913,475 B2 | 3/2018 | Sceats | |
| 9,975,100 B2 | 5/2018 | Heidel | |
| 10,358,364 B2 | 7/2019 | Sceats et al. | |
| 10,519,041 B2* | 12/2019 | Heidel | C01F 11/181 |
| 11,014,823 B2 | 5/2021 | Heidel et al. | |
| 11,667,538 B2* | 6/2023 | Heidel | B01D 9/0036 |
| | | | 423/430 |
| 2005/0079117 A1 | 4/2005 | Takahashi et al. | |
| 2008/0253956 A1 | 10/2008 | Rossi | |
| 2009/0016944 A1* | 1/2009 | DuBrucq | C01F 11/18 |
| | | | 423/580.1 |
| 2010/0034724 A1 | 2/2010 | Keith et al. | |
| 2010/0064890 A1 | 3/2010 | Keith et al. | |
| 2010/0202937 A1 | 8/2010 | Lackner et al. | |
| 2010/0230830 A1* | 9/2010 | Farsad | B01D 53/78 |
| | | | 261/111 |
| 2011/0226006 A1 | 9/2011 | Lackner et al. | |
| 2012/0003135 A1 | 1/2012 | Vollendorf | |
| 2012/0175303 A1 | 7/2012 | Gilron | |
| 2012/0230897 A1 | 9/2012 | Abanades Garcia | |
| 2014/0271379 A1 | 9/2014 | Heidel | |
| 2015/0050353 A1 | 2/2015 | Piene | |
| 2015/0329369 A1 | 11/2015 | Heidel | |
| 2017/0081207 A1 | 3/2017 | Heidel et al. | |
| 2020/0109059 A1 | 4/2020 | Heidel | |
| 2021/0284545 A1 | 9/2021 | Heidel | |

FOREIGN PATENT DOCUMENTS

| | | |
|---|---|---|
| CN | 1088040 | 7/2002 |
| CN | 1264752 | 7/2006 |
| EP | 0953544 | 3/1999 |
| EP | 1256549 | 11/2002 |
| JP | S5176198 | 7/1976 |
| JP | S59213617 | 12/1984 |
| JP | S62230616 | 10/1987 |
| JP | H0824571 | 1/1996 |
| JP | H0881890 | 3/1996 |
| JP | H10292283 | 11/1998 |
| JP | 2001199720 | 7/2001 |
| JP | 2002293537 | 10/2002 |
| JP | 2003292320 | 10/2003 |
| JP | 2005179785 | 7/2005 |
| JP | 2005289688 | 10/2005 |
| JP | 2007021294 | 2/2007 |
| JP | 2009001438 | 1/2009 |
| JP | 2010505613 | 2/2010 |
| JP | 2011001641 | 1/2011 |
| JP | 2011184240 | 9/2011 |
| WO | WO1987003314 | 6/1987 |
| WO | WO1999012851 | 3/1999 |
| WO | WO2008042919 | 4/2008 |
| WO | WO2010022339 | 2/2010 |
| WO | WO2014164738 | 10/2014 |

OTHER PUBLICATIONS

Baciocchi et al., "Process design and energy requirements for the capture of carbon dioxide from air," Chemical Engineering and Processing, vol. 45, No. 12, Dec. 1, 2006, pp. 1047-1058.
Cantrell, et al., "Measurement of the Vapor Pressure of Supercooled Water Using Infrared Spectroscopy," J. Atmos. Oceanic Technol., vol. 25, 2008, pp. 1724-1729.
Chinese Notice On The First Office Action, Chinese Application No. 201480027511.0, Sep. 12, 2016, 12 pages.
Chinese Notice On The First Office Action, Chinese Application No. 201580039342.7, Nov. 14, 2017, 14 pages.
Costodes, "Reactive crystallization of nickel hydroxyl-carbonate in fluidized-bed reactor: Fines production and column design," Chemical Engineering Science, vol. 61, 2006, pp. 1377-1385.
International Search Report and Written Opinion for International application No. PCT/US2014/023368, mailed Oct. 13, 2014, 11 pages.
International Search Report and Written Opinion for International application No. PCT/US2015/030975, mailed Aug. 13, 2015, 13 pages.
Japanese Notice On The First Office Action, Japanese Application No. 2016-501218, Feb. 19, 2018, 6 pages.
Jemaa et al., "Caustic Soda Production from Green Liquor Using the Green Liquor Splitting (GLS) System," retrieved from Internet Mar. 13, 2013, http://www.tappi.org/Downloads/unsorted/UNTITLED---ICR0433pdf.aspx, 10 pages.
Lier, "Crystalactor technology and its application in the mining and metallurgical industry," Solid/Liquid separation including Hydrometallurgy and the Environment, 29th Annual Hydrometallurgical Meeting, Jan. 1, 1999, retrieved online: http://www.environmental-expert.com/Files%5C587%5Carticles%5C5520%5Cpaques12.pdf, 8 pages.
Pulping and Bleaching, PSE 476, Lecture 6, Kraft Pulping Chemicals, Power Point, retrieved from Internet, Mar. 13, 2013, https://www.google.ca/url?sa=t&rct=j&q=&esrc=s&source=web&cd=1&ved=0CC4QFjAA&url=http%3A%2F%2Fwww.sefs.washington.edu%2Fclasses.pse.476%2FPowerpoint%2FPowerpoint-Renata%2Fpse%2520476-6%2520kraft%2520pulping%2520chemicals.ppt&ei=9UI_UbfsM4qpqwH3-YGIBA&usg=AFQjCNF3B57FXzregpEorMkfAxGH5do8NQ&bvm=bv.43287494,d.aWM&cad=rja, 17 pages.
Reddy et al., "Calcite Crystal Growth Inhibition by Phosphonates," Desalination, vol. 12, 1973, pp. 61-73.
Reddy et al., "Calcite Crystal Growth Rate Inhibition By Aquatic Humic Substances," Advances in Crystal Growth Inhibition Technologies, 2000, pp. 107-121.
Tai et al., "Effects of magnetic field on the crystallization of CaCo3 using permanent magnets," Chemical Engineering Science 63, 2008, pp. 5606-5612.
Tai et al., "Crystal Growth Kinetics of Calcite in a Dense Fluidized-Bed Crystallizer," AIChE Journal, Aug. 1999, vol. 45, No. 8, pp. 1605-1614.
Weissbuch et al., "Tailor-Made" Additives and Impurities, Crystallization Technology Handbook, A. Mersmann, Second Edition, Marcel Dekker, Inc., 2001, pp. 563-616.

(56) References Cited

OTHER PUBLICATIONS

Wiencek, "Crystallization of Proteins," Allan S. Myerson, Handbook of Industrial Crystallization, Second Edition, Butterworth-Heinemann, 2002, chapter 12, pp. 267-285.

* cited by examiner

RECOVERING A CAUSTIC SOLUTION VIA CALCIUM CARBONATE CRYSTAL AGGREGATES

CROSS-REFERENCE TO RELATED APPLICATIONS

This application is a continuation application of and claims priority under 35 U.S.C. § 120 to U.S. application Ser. No. 17/236,478, filed on Apr. 21, 2021 now U.S. Pat. No. 11,667,538, which is continuation application of and claims priority under 35 U.S.C. § 120 to U.S. application Ser. No. 16/704,088, filed on Dec. 5, 2019, now U.S. Pat. No. 11,014,823, which is a continuation application of and claims priority to U.S. application Ser. No. 15/370,620, filed on Dec. 6, 2016, now U.S. Pat. No. 10,519,041, which is a divisional of, and claims priority to, U.S. patent application Ser. No. 14/281,430, entitled "Recovering a Caustic Solution Via Calcium Carbonate Crystal Aggregates," filed on May 19, 2014, now U.S. Pat. No. 9,637,393, the entire contents of which are incorporated by reference herein.

TECHNICAL FIELD

The disclosure is related to a method of recovering a caustic solution from a carbonate solution.

BACKGROUND

The industrial Kraft process takes wood and converts it into wood pulp for many uses. In general, the process involves cooking the wood chips in chemicals, mainly comprising a mix of sodium hydroxide and sodium sulfide, known commonly as white liquor in the pulping industry. After the cooking process, the cooked wood is separated from the liquids, the resulting liquid is commonly called black liquor, with varying chemical composition depending upon the type of wood. The black liquor is converted back into white liquor in a process commonly known as a caustic-recovery process, or chemical recovery process.

The first step in the conventional caustic recovery process is concentration of black liquor from the pulping process. Concentrated black liquor is sent to a recovery boiler to (1) recover the key chemical compounds, such as sodium carbonate, sulfides etc.; (2) combust the organics material in the black liquor; and (3) to recover energy which may be used throughout the pulp and paper mill or exported out of the plant. The smelt from the recovery boiler is generally mixed with a solution commonly known as weak liquor from the caustic recovery process, the resulting mixture of the weak liquor and the boiler smelt is commonly referred to as green liquor and generally contains sodium carbonate, sodium hydroxide, sodium hydrosulfide and may contain other compounds such as sodium sulfite, sodium thiosulfate and other process or non-process impurities.

The green liquor and calcium oxide, CaO, solids (commonly known as quicklime or burnt lime) from the downstream calciner are fed into a stirred tank reactor, generally known as slaker or lime-slaker. Two reactions, reaction (1) and reaction (2), take place in the slaker. First CaO reacts with water in the green liquor to form calcium hydroxide (Ca(OH)$_2$, commonly known as slaked lime, hydrated lime, builders' lime, pickling lime, or Chuna) via reaction (1).

$$CaO_{(s)} + H_2O_{(aq)} \rightarrow Ca(OH)_{2(s)} \qquad (1)$$

As soon as any calcium hydroxide Ca(OH)$_2$ is formed it begins reacting with sodium carbonate in the green liquor to form solid calcium carbonate (CaCO$_3$) through nucleation, via reaction (2).

$$Ca(OH)_2(s) + Na_2CO_3(aq) \leftrightarrow CaCO_3(s) + 2NaOH(aq) \qquad (2)$$

Reaction (1) and Reaction (2) are generally known as the slaking reaction and the causticization reaction, respectively; and both reactions occur simultaneously anytime water containing carbonate is mixed with quicklime.

The bulk of the causticization reaction takes place in the slaker. Generally, the contents from the slaker are fed into a series of stirred tanks, typically referred to as causticizers, where the reactions are allowed to proceed to near completion. The resulting solution is referred to as unclarified white liquor and contains, among other chemicals, suspended CaCO$_3$ particles, called lime mud which are around 15 μm in diameter.

Thereafter, generally the lime mud is first removed from the white liquor via clarifying tanks or pressurized filters. Typical filtration equipment for this step includes pressurized tubular filters or pressurized disc filters. The resulting clarified white liquor is returned to the pulping process to cook more wood chips, and the lime mud is sent for further washing and filtration before being calcined. Calcination is the term for converting the lime mud (CaCO$_3$) into quicklime (CaO):

$$CaCO_3(s) \rightarrow CaO(s) + CO_2(g) \qquad (3)$$

The resulting off-gas is typically cleaned and discharged to atmosphere while the produced CaO is sent back to the slaker for reaction with the green liquor.

The lime mud in the conventional caustic recovery process fouls both the calciner and any downstream gas processing equipment. Rotary kilns have been shown to tolerate the fouling caused by the lime mud and operate continuously requiring only minor shutdowns for cleaning and maintenance. As a result, the rotary kiln is the most common type of calciner applied today to calcine lime mud and the hot off-gases from the kiln are commonly used to dry incoming lime mud as they will foul any other type of equipment. The rotary kiln is a large, expensive, difficult to operate piece of equipment and the off-gases are vented to the atmosphere still containing a large quantity of high grade heat resulting in an overall thermal efficiency of around 40%. Many of the challenges in the calcination section of the conventional caustic recovery process are a direct result of the fine particle size of lime mud and its tendency to foul high temperature solids processing equipment.

SUMMARY

In a general implementation, a method for growing crystalline calcium carbonate solids in the presence of an alkaline carbonate solution in a fluidized-bed reactive crystallizer such that each of at least a portion of the crystalline calcium carbonate solids reach a volume of 0.0005 mm$^3$ to 5 mm$^3$ includes: reacting, in a slaking process, quicklime (CaO) and a low carbonate content fluid to yield a slurry of primarily slaked lime (Ca(OH)$_2$); introducing the slurry of primarily slaked lime and an alkaline solution including between 0.1M to 4.0M hydroxide and between 0.1M to 4.1M carbonate into a fluidized-bed reactive crystallizer that includes a solid bed mass; reacting the Ca(OH)$_2$ slurry and the alkaline carbonate solution to deposit a portion of the precipitated calcium carbonate (CaCO$_3$) onto the existing bed of solids that (1) causes the solids to grow in volume, (2)

decreases a concentration of dissolved carbonate, and (3) increases a concentration of dissolved hydroxide; and discharging a portion of the crystalline calcium carbonate solids and the alkaline carbonate solution, the solids including particles that each include a volume within the range from about 0.0005 mm$^3$ to about 5 mm$^3$.

A first aspect combinable with the general implementation further includes introducing seed material to maintain a constant mass of seed material within the fluidized-bed reactive crystallizer.

In a second aspect combinable with any of the previous aspects, the Ca(OH)$_2$ slurry content includes a range of percent by weight of solid Ca(OH)$_2$ between: 2 wt % to 40 wt %; 20 wt % to 40 wt %; 25 wt % to 40 wt %; 30 wt % to 38 wt %; or 30 wt % to 35 wt %.

A third aspect combinable with any of the previous aspects further includes controlling an environment of the slaking process to yield Ca(OH)$_2$ particles that are each sized between 0.1 to 100 micrometers, between 0.1 to 50 micrometers, between 0.1 to 20 micrometers, between 0.1 to 10 micrometers, or between 0.1 to 5 micrometers.

In a fourth aspect combinable with any of the previous aspects, the low carbonate content fluid includes water, and an amount of carbonate in the water includes less than about 0.1 moles of carbonate for every 1 mole of CaO delivered to the slaking process.

In a fifth aspect combinable with any of the previous aspects, introducing the slurry of primarily slaked lime includes injecting the slurry into a recirculation stream influent upstream of the fluidized-bed reactive crystallizer.

In a sixth aspect combinable with any of the previous aspects, introducing the alkaline solution includes injecting the alkaline solution into the recirculation stream influent upstream of the fluidized-bed reactive crystallizer.

In a seventh aspect combinable with any of the previous aspects, introducing the Ca(OH)$_2$ slurry includes feeding the slurry into one or more planes that are orthogonal to fluid flow along a height of the fluidized-bed reactive crystallizer, and at one or more points within each plane.

In an eighth aspect combinable with any of the previous aspects, introducing the Ca(OH)$_2$ slurry includes using an eductor to dilute the slurry with fluid and facilitate transport of slurry into the fluidized-bed reactive crystallizer with at least one injection port or at least one lance fluidly coupled to the fluidized-bed reactive crystallizer.

A ninth aspect combinable with any of the previous aspects further includes introducing an additive.

A tenth aspect combinable with any of the previous aspects further includes lowering a viscosity of the Ca(OH)$_2$ slurry based on introducing the additive.

An eleventh aspect combinable with any of the previous aspects further includes reducing an amount of time to complete the slaking process based on introducing the additive.

In a twelfth aspect combinable with any of the previous aspects, each Ca(OH)$_2$ particle in the slurry includes a volume within the range from between 5×10-10 mm3 and 5×10-4 mm3, between 5×10-10 mm3 and 6.5×10-5 mm3, between 5×10-10 mm3 and 4×10-6 mm3, between 5×10-10 mm3 and 5×10-7 mm3, or between 5×10-10 mm3 and 6.5×10-8 mm3, based on introducing the additive.

In a thirteenth aspect combinable with any of the previous aspects, the additive includes an inorganic or organic additive.

In a fourteenth aspect combinable with any of the previous aspects, the additive includes a natural or synthetic additive.

A fifteenth aspect combinable with any of the previous aspects further includes controlling a dissolution rate of Ca(OH)$_2$ in the fluidized-bed reactive crystallizer based on introducing the additive.

In a sixteenth aspect combinable with any of the previous aspects, the additive includes nitrilotriacetic acid, phenol, sucrose, NH4Cl, or H-EDTA.

A seventeenth aspect combinable with any of the previous aspects further includes accelerating a growth rate of the calcium carbonate crystals formed on the solid bed mass within the fluidized-bed reactive crystallizer, at a particular calcium saturation level, based on introducing the additive.

An eighteenth aspect combinable with any of the previous aspects further includes controlling one or more physical properties of the calcium carbonate crystals formed within the fluidized-bed reactive crystallizer based on introducing the additive.

A nineteenth aspect combinable with any of the previous aspects further includes decreasing a porosity of the calcium carbonate crystals based on introducing the additive.

A twentieth aspect combinable with any of the previous aspects further includes increasing a hardness or a resistance to crushing of the calcium carbonate crystals based on introducing the additive.

A twenty-first aspect combinable with any of the previous aspects further includes reducing a presence of low melting salts associated with the calcium carbonate crystals based on introducing the additive, the low melting salts located on a surface of the calcium carbonate crystal aggregates, within a lattice of the calcium carbonate crystals, or within pores of the calcium carbonate crystal aggregates.

A twenty-second aspect combinable with any of the previous aspects further includes reducing a spontaneous nucleation of new calcium carbonate crystals based on introducing the additive.

In a twenty-third aspect combinable with any of the previous aspects, the height of the solid bed mass is between 15 feet and 50 feet, between 30 feet and 50 feet, or between 30 feet and 40 feet.

A twenty-fourth aspect combinable with any of the previous aspects further includes controlling a level of total suspended solids within the fluidized-bed reactive crystallizer to between 0 ppm and 10,000 ppm, between 50 ppm and 5,000 ppm, or between 100 ppm and 1500 ppm.

In a twenty-fifth aspect combinable with any of the previous aspects, controlling a level of total suspended solids within the fluidized-bed reactive crystallizer includes at least one of: using a solids-liquid separation process; controlling a calcium loading rate; or controlling at least one equipment configuration characteristic.

In a twenty-sixth aspect combinable with any of the previous aspects, the equipment configuration characteristic includes at least one of a solid mass bed height, or a chemical injection delivery device.

In a twenty-seventh aspect combinable with any of the previous aspects, the solids-liquid separation process includes at least one of filtration, clarification, or centrifugation.

A twenty-eighth aspect combinable with any of the previous aspects further includes minimizing a time spent outside of the solid bed mass of any fluid including undissolved Ca(OH)$_2$ which is withdrawn from and intended to be returned to the fluidized-bed reactive crystallizer.

In a twenty-ninth aspect combinable with any of the previous aspects, a volume of each discharged crystalline calcium carbonate solid is between 0.065 mm$^3$ to 4.2 mm$^3$, between 0.22 mm$^3$ to 1.77 mm$^3$, or between 0.32 mm$^3$ to 1.02 mm$^3$.

In a thirtieth aspect combinable with any of the previous aspects, a volume of each discharged crystalline calcium carbonate solid is between 0.0005 mm$^3$ to 0.04 mm$^3$.

A thirty-first aspect combinable with any of the previous aspects further includes separating a portion of the discharged crystalline calcium carbonate solids that are below a desired volume; and returning the separated portion to the fluidized bed reactive crystallizer to continue to grow.

A thirty-second aspect combinable with any of the previous aspects further includes removing, from the alkaline carbonate solution, an amount of carbonate between 10 mole % to 100 mole %, between 15 mole % to 50 mole %, between 15 mole % to 40 mole %, or between 20 mole % to 30 mole % that is delivered to the fluidized-bed reactive crystallizer as part of the influent alkaline solution stream.

In a thirty-third aspect combinable with any of the previous aspects, the removed carbonate includes a solid calcium carbonate.

In a thirty-fourth aspect combinable with any of the previous aspects, removing, from the alkaline carbonate solution, an amount of carbonate includes leaving an amount of hydroxide from the solid Ca(OH)2 influent slurry stream dissolved in the alkaline carbonate solution as an aqueous hydroxide.

In a thirty-fifth aspect combinable with any of the previous aspects, the seed material possesses a similar crystalline structure to that of the crystalline calcium carbonate solids, and the crystalline structure is similar to at least one of silica, aragonite, calcite, or vaterite.

In a thirty-sixth aspect combinable with any of the previous aspects, a volume of each seed in the seed material is selected such that the seed material makes up between 0.5 wt % to 20 wt %, between 1 wt % to 10 wt %, between 2 wt % to 7 wt %, or between 2 wt % to 5 wt % of the discharged crystalline calcium carbonate solids.

A thirty-seventh aspect combinable with any of the previous aspects further includes processing at least a portion of the crystalline calcium carbonate solids to produce a seed material; and growing new calcium carbonate crystal aggregates on the seed material.

A thirty-eighth aspect combinable with any of the previous aspects further includes controlling material introduced into the fluidized-bed reactive crystallizer to control an impurity concentration level within the crystalline calcium carbonate solids below a maximum acceptable impurity concentration level.

In a thirty-ninth aspect combinable with any of the previous aspects, an impurity of the crystalline calcium carbonate solids includes one or more of phosphates, calcium carbonate, magnesium ions, Group II A ions, strontium, radium, iron ions, phosphonates, or zinc.

In a fortieth aspect combinable with any of the previous aspects, reacting, in a slaking process, quicklime (CaO) and a low carbonate content fluid to yield a slurry of primarily slaked lime (Ca(OH)$_2$) includes reacting, in a slaking process for a particular time and at a particular temperature that are based at least in part on a desired rate of conversion of calcium oxide to calcium hydroxide.

In a forty-first aspect combinable with any of the previous aspects, the particular time includes between 1 minute and 120 minutes.

In a forty-second aspect combinable with any of the previous aspects, introducing the slurry of primarily slaked lime includes injecting, with one or more lances, the slurry directly into the solid bed mass.

In a forty-third aspect combinable with any of the previous aspects, the one or more lances includes a plurality of lances positioned to inject the slurry at injecting sites through a horizontal cross section of an area of the solid bed mass.

In a forty-fourth aspect combinable with any of the previous aspects, introducing an additive includes introducing an additive into the slaking process or the Ca(OH)2 slurry transfer system.

A forty-fifth aspect combinable with any of the previous aspects further includes increasing a transfer rate of the slurry to the fluidized-bed reactive crystallizer based on introducing the additive.

Another general implementation includes a system for growing crystalline calcium carbonate solids in the presence of an alkaline carbonate solution such that each of at least portion of the crystalline calcium carbonate solids include a volume of 0.0005 mm$^3$ to 5 mm$^3$, including a slaker configured to react quicklime (CaO) and a low carbonate content fluid to yield a slurry of primarily slaked lime (Ca(OH)$_2$); a fluidized-bed reactive crystallizer that encloses a solid bed mass and includes an input for a slurry of primarily slaked lime, an input for an alkaline solution including between 0.1M to 4.0M hydroxide and between 0.1M to 4.1M carbonate, and an output for crystalline calcium carbonate solids that include particles each with a volume between 0.0005 mm$^3$ and about 5 mm$^3$ and an alkaline carbonate solution; a dewatering apparatus that includes an input coupled to the output of the fluidized-bed reactive crystallizer and an output configured to discharge a plurality of separate streams that each include a portion of the crystalline calcium carbonate solids and alkaline carbonate solution; and a seed transfer apparatus configured to deliver seed material into the fluidized-bed reactive crystallizer to maintain a consistent mass of seed material within the fluidized-bed reactive crystallizer.

In a first aspect combinable with the general implementation, the seed transfer apparatus is further configured to return a portion of the crystalline calcium carbonate solids that include a volume less than about 0.3 mm$^3$ from the dewatering apparatus, together with the seed material, to the fluidized-bed reactive crystallizer.

In a second aspect combinable with any of the previous aspects, the seed transfer apparatus is further configured to return a portion of the crystalline calcium carbonate solids that include a volume less than about 0.3 mm$^3$ from the dewatering apparatus, to the fluidized-bed reactive crystallizer in separate batches from the seed material.

In a third aspect combinable with any of the previous aspects, the fluidized-bed reactive crystallizer includes a spouted bed.

In a fourth aspect combinable with any of the previous aspects, the fluidized-bed reactive crystallizer further includes a cone shaped entry section.

In a fifth aspect combinable with any of the previous aspects, the input for a slurry of primarily slaked lime includes an injection port fluidly coupled to a recirculation stream influent upstream of the fluidized-bed reactive crystallizer.

In a sixth aspect combinable with any of the previous aspects, the input for the alkaline solution includes an injection port fluidly coupled to the recirculation stream influent upstream of the fluidized-bed reactive crystallizer.

In a seventh aspect combinable with any of the previous aspects, the input for a slurry of primarily slaked lime includes a plurality of injection ports positioned to introduce the slurry into one or more planes that are orthogonal to fluid flow along the height of the fluidized-bed reactive crystallizer and at one or more points within each plane.

An eighth aspect combinable with any of the previous aspects further includes an input for an additive.

In a ninth aspect combinable with any of the previous aspects, the height of the solid bed mass is between 15 feet and 50 feet, between 30 feet and 50 feet, or between 30 feet and 40 feet.

A tenth aspect combinable with any of the previous aspects further includes a solids-liquid separator to control a level of total suspended solids within the fluidized-bed reactive crystallizer.

In an eleventh aspect combinable with any of the previous aspects, the solids-liquid separator includes at least one of a filter, a clarification system, or a centrifuge.

A twelfth aspect combinable with any of the previous aspects further includes a controller configured to control a calcium loading rate to control a level of total suspended solids within the fluidized-bed reactive crystallizer.

A thirteenth aspect combinable with any of the previous aspects further includes a separator fluidly coupled to an output of the dewatering apparatus to separate a portion of the discharged crystalline calcium carbonate solids that are below a desired volume, the separator including an output fluidly coupled to the fluidized bed reactive crystallizer to return the separated portion to the fluidized bed reactive crystallizer.

In a fourteenth aspect combinable with any of the previous aspects, the fluidized bed reactive crystallizer is further configured to process at least a portion of the crystalline calcium carbonate solids to produce a seed material, and grow new calcium carbonate crystal aggregates on the seed material.

In a fifteenth aspect combinable with any of the previous aspects, the input for the slurry of primarily slaked lime includes an eductor configured to dilute the slurry with fluid and facilitate transport of slurry into the fluidized-bed reactive crystallizer; and at least one injection port or at least one lance fluidly coupled to the fluidized-bed reactive crystallizer.

Various implementations of the systems and processes for recovering a caustic solution from a carbonate solution may include one or more of the following features. For example, the disclosed systems and processes may utilize a fluidized-bed reactive crystallizer rather than a standard crystallizer vessel. As another example, systems and processes may feature the production of calcium carbonate crystal aggregates with average volumes equivalent to spheres with diameters between 0.1 mm to 2 mm. As another example, systems and processes may feature calcium carbonate crystal aggregates having the size, morphology, and physical properties so that any moisture they retain upon removal from a solution is primarily surface moisture and easily displaced or removed. As another example, systems and processes may features a low carbonate conversion rate, tolerance for TSS in influent streams, high solution pH and slow dissolution of $Ca(OH)_2$ slurry. As a further example, systems and processes may run at higher effluent TSS levels than are normally expected to produce poor reactor performance in lower pH (e.g., pH 7-10) systems, because it is typically expected that a higher TSS in the effluent is associated with a reduction in the percent of calcium retained on the pellets inside the bed mass. Further, the disclosed systems and processes may achieve economically viable retention rates at calcium loading rates comparable to water treatment industries. In some example implementations, the disclosed systems and processes may operate with high pH (for example, pH>14) where most of the $CO_2$ is present as carbonate ($CO_3$), and very little as bicarbonate ($HCO_3$). Further, the systems and processes may utilize a spouted bed or cone fluidized-bed reactor design for an elegant and less expensive solution that is better suited for direct feed of a concentrated lime slurry when compared to systems designed to deal with chemical addition in applications where the chemical dissolution rates are much faster and where relative calcium carbonate supersaturation is more likely to occur.

These general and specific aspects may be implemented using a device, system, process, or any combinations of devices, systems, or processes. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

DETAILED DESCRIPTION

The systems and processes described in the present disclosure, in some implementations, segregates the reactions (1) and (2) mentioned above into different units within the processes instead of allowing these reactions to occur within a common environment and/or unit. The systems and processes described in the present disclosure also use a different process and apparatus, within which reaction (2) takes place, as compared to convention systems and processes. This apparatus, a fluidized-bed reactive crystallizer (pellet reactor), enables the production of large, low porosity pellets that are easier to handle and dewater than the above mentioned lime mud.

This pellet reactor technology is currently used in applications within the water softening and water treatment industries under significantly different conditions, environments, chemistry and equipment configurations, and for different end results, than as it is applied in the systems and processes described here. For example, the main applications of the pellet reactor within the water softening and water treatment industries are to remove trace amounts of phosphates and/or metals from water. The pellets themselves are not considered as the primary product, but rather as a by-product. The pellet reactor configuration needed to accomplish these water softening and treatment actions includes complex chemical injection systems, or lances with distribution nozzles, to ensure proper distribution of the chemistry and avoidance of localized supersaturation and the associated problems. The pellet reactor bed heights are also significantly different for water treatment and softening processes as compared to the systems and processes described herein, typically ranging between 20 feet to 30 feet. Further, while the current applications of pellet reactor equipment do sometimes use calcium hydroxide solutions within their chemistry, they do not have restrictions on water input to their systems and as such they can use much more dilute sources of calcium hydroxide solutions (e.g., typically less than 20 weight percent, often less than 10 weight percent $Ca(OH)_2$).

Figure 1:
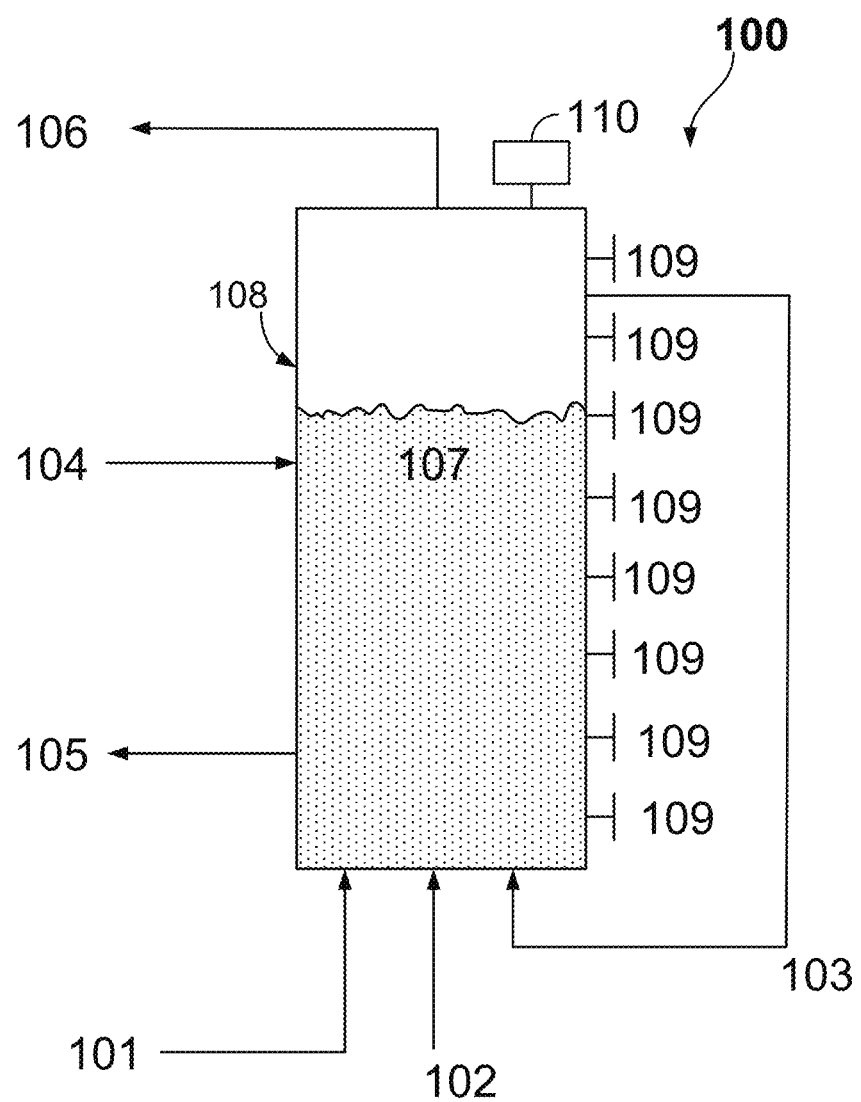
FIG. 1 illustrates an example implementation of a fluidized-bed reactive crystallization process unit that may be used as part of a larger process for growing calcium carbonate crystal aggregates while reducing the dissolved carbonate content and increasing the dissolved hydroxide content of the effluent liquid stream.

FIG. 1 illustrates an example implementation of a fluidized-bed reactive crystallization process unit (e.g., also referred to herein as a fluidized-bed reactive crystallizer, a fluidized-bed reactor, or reactor) that may be used as part of a larger process for recovering a caustic solution from a carbonate solution. In some implementations, the illustrated fluidized-bed reactive crystallization process unit may be used as unit 1120 as shown and described in the process of FIGS. 4-6. The fluidized-bed reactive crystallization process grows calcium carbonate crystal aggregates while reducing the dissolved carbonate content and increasing the dissolved hydroxide content of the effluent liquid stream. The dissolved carbonate content can be reduced using other calcium based salts such as calcium chloride, however in these cases, the solution's hydroxide concentration would not increase.

In some aspects, the solids (e.g., crystal aggregates) produced consist of calcium carbonate in the form of calcite, aragonite, or vaterite. As illustrated in FIG. 1, the example system 100 and process includes a reactor 108, a fluidized bed of solid material 107, influent streams 101 and 103 that enter at or near the bottom of the reactor 108, influent seed material 4, influent stream 2 containing calcium hydroxide slurry, effluent stream 105 of calcium carbonate crystal aggregates material, effluent alkaline solution stream 106, entry points 109 used to either add supplemental chemicals such as additives or additional calcium hydroxide slurry or for sample removal, and a control system or controller 110.

Controller 110 (also shown in FIGS. 2-3), in some aspects, may be communicably coupled to one or more apparatus (e.g., valves, pumps, flow meters, sensors, or otherwise) used to control the system 100 and associated processes performed with or by the system 100. The controller 110 can include digital electronic circuitry (e.g., a PLC controller), or computer software, firmware, or hardware, including the structures disclosed in this specification and their structural equivalents, or combinations of one or more of them. For example, the controller 110 can be a microprocessor based controller as well as an electro-mechanical based controller. Instructions and/or logic in the control system (e.g., to control the system 100), can be implemented as one or more computer programs, e.g., one or more modules of computer program instructions, encoded on computer storage medium for execution by, or to control the operation of, data processing apparatus. Alternatively or in addition, the program instructions can be encoded on an artificially generated propagated non-transitory signal, e.g., a machine-generated electrical, optical, or electromagnetic signal that is generated to encode information for transmission to suitable receiver apparatus for execution by a data processing apparatus. In some instances, the controller 110 may be a slave to the control system 1108 described with reference to FIGS. 4-6.

The entry points 109 may be positioned at one or more points along a plane orthogonal to the direction of fluid flow through the reactor 108, such that proper mixing of the additive or calcium hydroxide may be enhanced and/or achieved. These entry points 109 may include, in some implementations, injection lances and nozzles that are designed to enhance the mixing and distribution of the chemical or additive within the fluidized bed mass 107 and may also include or be coupled to an eductor to assist with transfer of the additive or chemical from the injection system into the solid bed mass. In some aspects, there may be multiple injection lances or nozzles that extend from various locations around a circumference (or other exterior surface) of the reactor 108. The multiple injection lances or nozzles may extend into the reactor 108 in parallel or at various angles. In some cases, one or more of the lances or nozzles may include a main trunk and branches that angularly extend from the trunk within the reactor 108.

In some example implementations described herein, a fluidized-bed reactive crystallizer may include one, some, or all of the following features: (1) utilizes liquid flow, in an upward direction to suspend solid particles that make up the solid bed mass component of the fluidized-bed; (2) partially filled with a suitable seed material that serves as the surface area on which calcium carbonate can precipitate to grow the solid particle bed mass; (3) is fed seed material in a continuous or batch mode in such a way as to replace seed material lost from the apparatus when full sized solid particles are discharged and sent to downstream processing; and/or (4) is fed a slurry containing $Ca(OH)_2$ that provides the driving force for precipitating the calcium carbonate onto the solid bed.

The first step in this example process shown in FIG. 1 is to introduce the solid seed material influent stream 104, which is used to provide surface area for the precipitation of calcium carbonate. In some example implementations described herein, seed material 104 may be or may include solid particles each having a volume less than the target volume for a discharged pellet. For example, the fluidized-bed reactive crystallizer may be initially filled with seed material 104, and the precipitated calcium carbonate deposits on this seed material 104, causing the volume of each particle to increase until it reaches the desired size range and is discharged from the bed 107. The discharged calcium carbonate crystal aggregates that leave the fluidized-bed reactive crystallizer 108 may contain a portion of seed material 104.

In some aspects, the seed material 104 may include limestone that contains calcium carbonate in the form of calcite, aragonite, and/or vaterite. In some aspects, the seed material 104 used contains silica. In some aspects, the seed material 104 is obtained from other industrial sources such as pellets (e.g., crystal aggregates) produced in waste water treatment processes or water softening processes, that has been ground to the desired seed size. In some aspects, the seed material is obtained by extracting a portion of the discharged mature calcium carbonate crystal aggregates, grinding them down to seed size and re-using as seed material. This may help maintain consistency within the pellet material instead of introducing new material from an external source in the form of seed.

In some aspects, a designated pellet reactor may be used to produce seed material in cases where there may be issues with composition (e.g., compositional variance, impurities) of the calcium carbonate seed normally procured from a commercial vendor, for example a limestone vendor that provides ground limestone from geological source(s). In some examples, sufficient seed material 104 is added such that, once fluidized, the solid bed 107 may expand to have a height within the range of 15 feet to 50 feet.

In a next step, the alkaline solution 1 is then fed to the reactor 108. The influent alkaline solution stream 1 and a recirculation stream 3, which takes solution from the top of the fluidized-bed reactive crystallizer 108 and feeds it back into the bottom of the reactor 108, may enter the reactor 108 independently and may be used to provide a proper fluidization of the solid bed material 107. In some aspects, the process may be configured with a high recirculation flow to influent flow ratio range of approximately 19:1 to 50:1, where the recirculation flow provides the bulk of the flow which fluidizes the solid bed mass 107.

In some example implementations described herein, a solid bed mass may include solid particles that are fluidized within the reactor 108. The bulk of this solid mass may remain within the reactor 108, with only a small amount being withdrawn on a continuous or semi-continuous basis as mature pellets (e.g., mature calcium carbonate crystal aggregates). The solid bed mass, in some aspects, may provide a surface area onto which the calcium carbonate produced from the causticization reaction can precipitate. The majority of particles within the solid bed mass may be of size similar to the seed size or larger.

The fluidized bed of solids 107 may have excellent mixing in the directions orthogonal to the average liquid flow direction and intimate contact between the solids, which make up the bed 107, and the upward flow of fluid may keep the solids suspended. The velocity of the upward fluid flow is chosen based on the desired particles sizes to be fluidized and will only fluidize particles within a certain range. The fluidization flow is used to promote mixing (reduce calcium carbonate supersaturation) and control bed density, keep bed density high enough to maximize exposure of the solution to the surface area of the bed mass and prevent loss of bed material from reactor 108, and keep bed density low enough to minimize bed mass attrition and/or agglomeration issues.

In some aspects, the fluidization velocity range is between 60 meters per hour (m/h) to 120 m/h and in some aspects between 80 m/h and 100 m/h for mature pellet diameter range of between about 0.85 mm and 1.2 mm. In some aspects the fluidization velocity range is between 2 m/h and 70 m/h for a mature pellet diameter range between about 0.1 mm and 0.4 mm and in some examples between 2 m/h and 20 m/h for a mature pellet diameter range of about 0.1 mm and 0.2 mm.

In some example implementations, a fluidization velocity may define a linear velocity at which the fluid travels in a generally upward direction through the fluidized-bed reactive crystallizer. Fluidization velocity is sometimes used to help define the range of operating conditions that provide an optimum bed density or expansion of pellet bed such that the bed density is not too high as to cause abrasion and ultimately collapse of the bottom section of the bed (e.g., the bottom section of the fluidized bed where a large portion of the mature pellets tend to reside). It may also provide an optimum bed density that is not too low so as to reduce the retention of calcium onto the pellets and/or increase the amount of calcium turning into fines.

If the particles are too large, then the upward flow of fluid will not be able to suspend them and they will settle out of the fluidized bed and rest at the bottom of the unit and if the particles are too small they will be carried out of the fluidized bed through stream 106. In the case of a desired particle diameter of 1 mm, particles which are much larger, such as 5 mm in diameter, will settle out while small particles such as those produced by nucleation will be carried away in stream 106. In some aspects, the target diameter of the discharged mature pellet is about 0.85 mm to 1.2 mm.

In some aspects, there is a pumping energy associated with proper fluidization of this size of pellet in the alkaline solution being used for fluidization. In some aspects, the target mature pellet diameter is smaller, at about 0.100 mm to 0.85 mm diameter or at about 0.100 mm to 0.400 mm diameter. In some aspects, a smaller final pellet size may facilitate maintenance of the bed density or bed expansion in this system at the same optimal range as seen in the previous system (e.g., a system as described above that produces larger mature pellet sizes) would take less pumping energy but would still provide pellets of a size that can be efficiently dewatered.

In some example implementations, the bed expansion may define a percent increase in bed volume between when there is no fluidization (e.g., pellet bed is static and effectively resting at the bottom of the fluidized-bed reactive crystallizer) and when the system is being fluidized such that there is more fluid between the pellets and the bed volume has expanded, leading to a higher bed level in the fluidized-bed reactor 108.

Once proper fluidization of bed material is established and the height of the fluidized solid bed mass is between 15 feet and 50 feet within the reactor 108, the influent stream 102 containing calcium hydroxide slurry is independently added to the reactor 108, at one or more entry points, in a controlled manner, normally within a range between 5 kg-Ca/m$^2$/hr and 35 kg-Ca/m$^2$/hr, and in some aspects within a range between 20 k-Cag/m$^2$/hr and 30 kg-Ca/m$^2$/hr, such that spontaneous nucleation (e.g., production of smaller particles than desired) is inhibited while achieving a high rate of pellet growth.

In some aspects, this process may include calcium hydroxide slurries within the concentration range between approximately 2 wt % and approximately 40 wt %. The carbonate to calcium molar ratio entering the reactor 108 is usually in the range 1.1:1 to 30:1. The carbonate in the alkaline stream may, in some aspects, be in molar excess of the calcium hydroxide such that there is carbonate remaining in the effluent stream leaving the fluidized-bed reactive crystallizer. The calcium hydroxide dissolves into solution and becomes the limiting reagent in reaction (2), where calcium reacts with the dissolved carbonate content brought in by influent streams 1, 102, and 3 in close proximity to the solid bed material 107. This facilitates the precipitation of calcium carbonate onto the solid bed mass surface, resulting in growth of the individual solid particles. Example implementations of systems and/or processes described herein may work with a very low conversion rate of carbonate species across the bed. For example, example implementations of systems and/or processes described herein can be operated with approximately 10-25% conversion of aqueous carbonate to $CaCO_3$ solids.

The solution moving through the reactor 108 may be at a pH range above 12, and in some aspects above 14. This high pH inhibits the dissolution of the calcium hydroxide entering the reactor 108. Calcium hydroxide is known to have a non-instantaneous dissolution rate in alkaline solutions of much lower pH such as 7 to 10 as seen in water softening and waste water treatment applications; the higher pH of example implementations of systems and/or processes described herein (e.g., pH of greater than 14) further inhibit the dissolution rate of calcium hydroxide.

In some aspects, example implementations of systems and/or processes described herein may handle the slow dissolution of calcium hydroxide by extending the solid bed height to between 15 feet and 50 feet, such that there is sufficient residence time within the bed mass to fully dissolve the calcium hydroxide and react the calcium. This may promote calcium carbonate precipitation onto the solid bed mass (calcium carbonate crystal aggregates) instead of promoting nucleation outside of the solid bed which would result in spontaneous nucleation and fines production.

The $Ca(OH)_2$ entering the fluidized-bed reactive crystallizer 108 may be the limiting reagent and as such, may create an upper limit for how much influent carbonate is converted to calcium carbonate (and hence removed from solution). Therefore, the moles of influent $Ca(OH)_2$ may set a maximum difference in molar concentration of dissolved carbonate between the influent and effluent streams. The moles of influent $Ca(OH)_2$ may also set a maximum difference in molar concentration of dissolved hydroxide between the influent and effluent streams. In one example, where the influent [OH] is about 1M and the influent [$CO_3$] is about 0.5M, the calcium loading rate from the $Ca(OH)_2$ lime slurry is about 15 kg-Ca/m$^2$/hr, the recirculation to influent flow ratio is about 19:1, the fluidization velocity is between 80 m/h and 100 m/h, then the resulting difference (e.g., decrease) in molar concentration of carbonate between the influent and effluent streams can be between about 0.07M to 0.10M, which is between about 0.0037M to 0.0053M per bed pass. The associated difference (e.g., increase) in molar concentration of hydroxide between the influent and effluent streams can be between about 0.14M to about 0.20M, which is between about 0.0074M to 0.0105M per bed pass. For every mole of carbonate precipitated from solution by reaction (2), there are 2 moles of hydroxide dissolved into the solution.

Factors that can influence the molar concentration differences of carbonate and hydroxide, and the amount of $Ca(OH)_2$ reacted via reaction (2) across the fluidized-bed reactive crystallizer include flow rate of influent, fluid velocity requirements of the fluidized-bed reactive crystallizer 108, calcium loading rates, influent [OH] and [$CO_3$], and mechanical configuration of the fluidized-bed reactive crystallizer 108.

As a result of controlling the rate of reaction (2) and the environment where reaction (2) occurs, calcium carbonate crystal aggregates, each having an average volume equivalent to spheres with diameters between 0.1 mm and 2 mm, may be produced. While these solid particles grow in mass, they move towards the bottom of the reactor 108. The liquid from this process has had a portion of the aqueous carbonate precipitated (e.g., removed from solution) and a proportional amount of hydroxide has dissolved from the $Ca(OH)_2$ into the liquid and the resulting mixture is discharged as the effluent stream 106 while the solid calcium carbonate crystal aggregates which have grown to the desired size are removed from the fluidized bed reactive crystallizer 108 as effluent stream 5.

The larger individual pellet size, in conjunction with the low porosity of the resulting solid particles, may allow for simple downstream dewatering processes. This may also result in a calcium carbonate product with a much lower moisture content of less than about 15% of the total weight of the calcium carbonate crystal aggregates (as measured after the solids are drained on a screen). The inlet ports 109 may be used to provide additional chemicals such as additives or calcium hydroxide slurry in order to optimize the reactor 108 environment for producing pellets within the target size range, hardness, crushing strength, porosity, composition and purity, and to minimize spontaneous nucleation and production of particles smaller than desired and/or impurities from entering the effluent product streams and downstream processing steps.

Figure 2:
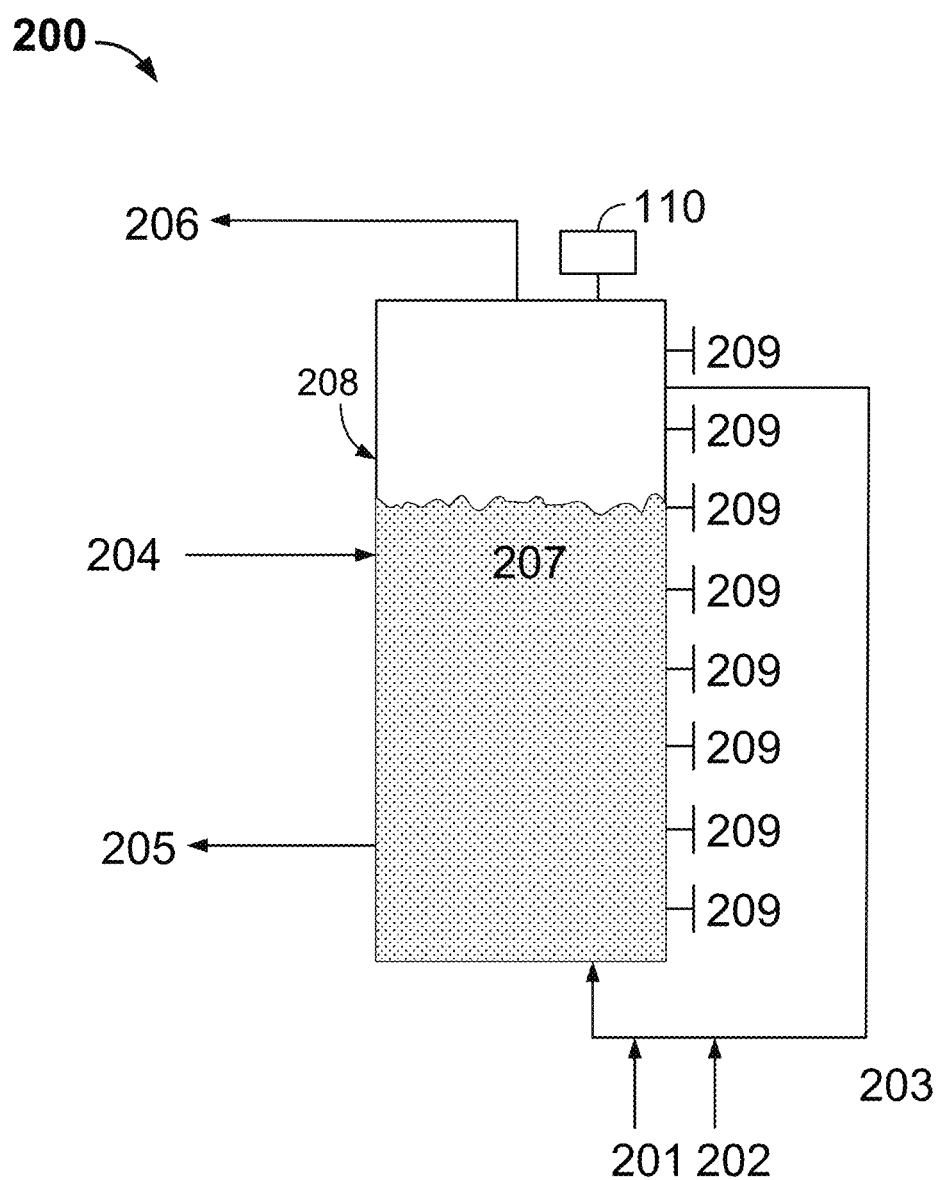
FIG. 2 illustrates a second example implementation of a fluidized-bed reactive crystallization process unit that may be used as part of a larger process for growing calcium carbonate crystal aggregates while reducing the dissolved carbonate content and increasing the dissolved hydroxide content of the effluent liquid stream.

FIG. 2 illustrates another example implementation of a fluidized-bed reactive crystallization process unit that may be used as part of a larger process for growing calcium carbonate crystal aggregates while reducing the dissolved carbonate content and increasing the dissolved hydroxide content of the effluent liquid stream. In some implementations, the illustrated fluidized-bed reactive crystallization process unit 208 may be used as unit 1120 as shown and described in the process of FIGS. 4-6. In some aspects, the illustrated fluidized-bed reactive crystallization process unit 208 may be substantially similar to the unit 108 shown in FIG. 1, with the exception that influent streams 201, 202 and 203, in the example of FIG. 2, may be combined directly upstream of reactor 208 to facilitate the mixing of influent stream 202 such that plugging and local unfavorable concentration conditions are minimized. Also, in some aspects, the entry section of the vessel in FIG. 2, where the influent streams are introduced, may be cone-shaped to facilitate good mixing behavior of both solution and solids.

When chemical addition to the fluidized-bed reactive crystallizer 208 has a fast dissolution rate, it may mean that the chemical dissolves instantly. As seen in waste water and water softening applications of fluidized-bed reactive crystallizers, this can lead to localized supersaturation at the entrance point(s) of the reactor 208, which, if not effectively mixed, can promote spontaneous nucleation, or in other words, produce fine particles (fines) which do not add to the pellet bed mass but instead are small enough to be elutriated by the upward flow of liquid and leave the bed as fine material. This resulting fine material reduces the reactor's crystallization efficiency and may require downstream filtration.

The configuration in FIG. 2 relies, at least in part, on the unmodified, slow dissolution rate of $Ca(OH)_2$ in the high pH environment of example implementations of systems and/or processes described herein to allow for mixing outside and upstream of the solid bed mass without nucleation occurring which would result in the production of smaller than desired particles, commonly known as fines. Example implementations of systems and/or processes described herein also employ the use of high concentrations of $Ca(OH)_2$ slurry influent.

In some aspects, high slurry concentrations of above 30 wt % and up to 40 wt % $Ca(OH)_2$ are used to minimize diluting the overall process solution with excess water.

There may be challenges to the use of these high concentrations of lime slurry. For example, $Ca(OH)_2$ slurries above 30 wt % $Ca(OH)_2$ are known to exhibit challenging fluid behaviors such as pseudo-plastic, bingham, and dilatant behavior. These behaviors can make mixing and transfer of this slurry difficult and prone to plugging, especially through the small lines required in the standard chemical lance injection systems.

The configuration shown in FIG. 2 may minimize (e.g., all or in part) these issues by eliminating the smaller line sizes and associated line restrictions and obstructions that are present with the lance injection equipment associated with FIG. 1. Because dissolution of $Ca(OH)_2$ may be slow, mixing with recirculation stream prior to contacting the solid bed mass will produce minimal production of total suspended solids (TSS) while facilitating efficient mixing and distribution of the $Ca(OH)_2$ in the influent stream. This injection process may be less complicated than use of multiple small inside diameter, high velocity, chemical injection lances needed to introduce the $Ca(OH)_2$ directly into the bottom of the solid bed mass.

In some example implementations, TSS, or total suspended solids, may include undissolved solids present in solution leaving and/or entering the solid bed mass, in the size range of about 2 microns to about 100 microns, and which are typically carried out of the bed (e.g., elutriated) by fluidization velocities that are within a range capable of suspending but not elutriating the larger calcium carbonate solid bed mass.

As shown, the system 200 may also differ from the system 100 based on the entry location of influent stream 201, which is the alkaline solution. This entry position is made possible by the nature of example implementations of systems and/or processes described herein, where the overall $[CO_3]$ and $[OH]$ in the influent stream 201 is not much different than that of the recirculation stream 203, and the recirculation stream is the bulk of the fluid entering the bottom of the reactor 208. This allows the insertion of the influent stream 201 into the recirculation stream directly upstream of the reactor entrance, rather than independently into the reactor 208, as it does not significantly impact the $[OH]$ and $[CO_3]$ compositions within the reactor 208.

Figure 3:
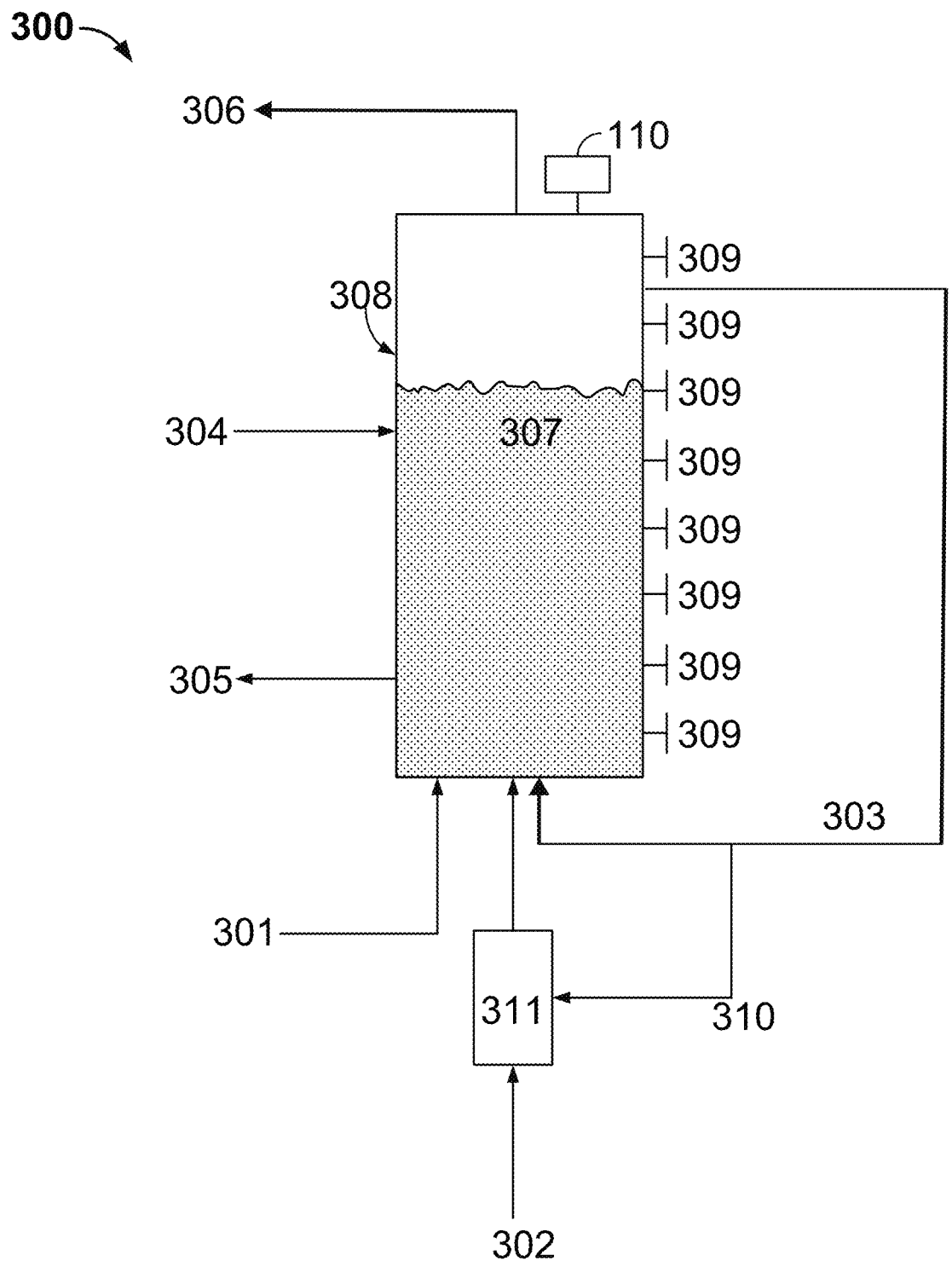
FIG. 3 illustrates a third example implementation of a fluidized-bed reactive crystallization process unit that may be used as part of a larger process for growing calcium carbonate crystal aggregates while reducing the dissolved carbonate content and increasing the dissolved hydroxide content of the effluent liquid stream.

FIG. 3 illustrates another example implementation of a fluidized-bed reactive crystallization process unit that may be used as part of a larger process for growing calcium carbonate crystal aggregates while reducing the dissolved carbonate content and increasing the dissolved hydroxide content of the effluent liquid stream. In some implementations, the illustrated fluidized-bed reactive crystallization process unit 308 may be used as unit 1120 as shown and described in the process of FIGS. 4-6. In some aspects, the illustrated fluidized-bed reactive crystallization process unit 308 may be substantially similar to the unit 108 shown in FIG. 1, with the exception that that slipstream 310 may be pulled from the recirculation loop and sent into an eductor 311, where it combines with the influent lime slurry stream 302 and pushes the lime slurry through into the reactor 308. This system 300 may resolve plugging issues seen when using $Ca(OH)_2$ slurry concentrations between 20 wt % to 40 wt %, in particular above 30 wt %, without removing the chemical lance injection systems, in that when using the lance injection system, the eductor 311 is added immediately upstream of the lance, as shown in FIG. 3. The eductor 311 utilizes a slipstream of the larger recirculation flow to dilute the solids in the lime slurry and/or help push the lime slurry through the lance system into the reactor 108. The slow dissolution rate of $Ca(OH)_2$ coupled with a short time for the fluid to travel from the eductor 311 into the fluidized bed 307 may prevent (e.g., all or partially) the causticization reaction and nucleation from occurring and producing particles smaller than the desired size (e.g., fines).

Previous lab scale testing of a fluidized-bed reactive crystallizer under process conditions of approximately 0.5M to 1.5M hydroxide and 0.2 to 0.8M carbonate (e.g., process conditions covered by the process shown in FIG. 1) used calcium hydroxide slurries containing as low as about 2 wt % $Ca(OH)_2$ and as high as about 38 wt % $Ca(OH)_2$.

Another example of this process was tested in a fluidized-bed reactive crystallizer under process conditions of approximately 0.5M to 1.5M potassium hydroxide and 0.2 to 0.8M potassium carbonate, (process conditions covered by this process), used calcium hydroxide slurries containing as low as about 35 wt % $Ca(OH)_2$ and as high as about 40 wt % $Ca(OH)_2$.

In one example of this process carried out in a fluidized-bed reactive crystallizer (e.g., as shown in FIG. 3), the pellets were grown up to approximately 0.85 mm to 1.2 mm diameter in an alkaline environment containing approximately 0.4M to 1.5M potassium hydroxide and 0.2M to 0.9M potassium carbonate on calcite seeds procured from a water softening treatment process. The seed content was approximately 5-10 wt % of the mature pellet. The resulting mature calcite pellets produced and discharged from the fluidized-bed reactive crystallizer exhibited properties and compositions as described below.

In the above example, the packed bulk density of the calcium carbonate pellets was measured at about 1.63-1.68 $g/cm^3$.

The particle size distribution (PSD) of a sample of mature pellets discharged from the above example of the process are shown in the table below:

| CaCO3 Pellet PSD info (Hazen) | |
|---|---|
| Size (Micron) | Cumulative Passing % |
| 1410 | 99.8 |
| 1190 | 99.7 |
| 1000 | 87 |
| 841 | 16.9 |
| 595 | 0.3 |
| 0 | 0.000001 |

Elemental composition of washed and dried calcium carbonate pellets grown from the above example of the process:

| 11743 HRI 53549 Washed and Dried May 30, 2013 16:52 | | | |
|---|---|---|---|
| Element | Wt % | Predicted Form | Wt % |
| Al | 0.068 | $Al_2O_3$ | 0.128 |
| Ca | 40.8 | $CaCO_3$ | 102 |
| $Fe_{Total}$ | 0.000 | $Fe_2O_3\ _{Total}$ | 0.000 |
| K | 0.568 | KOH | 0.815 |
| Mg | 0.232 | MgO | 0.385 |
| Mn | 0.000 | MnO | 0.000 |
| Na | 0.064 | $Na_2O$ | 0.086 |
| P | 0.006 | $P_2O_5$ | 0.014 |
| Si | 0.273 | $SiO_2$ | 0.584 |
| Ti | 0.004 | $TiO_2$ | 0.007 |
| Cr (ppm) | <50 | | |
| | | Sum | 103.9 |

In one example of this process carried out in a fluidized-bed reactive crystallizer, the pellets were grown up to approximately 0.85 mm to 1.2 mm diameter in an alkaline environment containing approximately 0.5M to 1.5M sodium hydroxide and approximately 0.2M to 0.6M sodium carbonate on aragonite seed material. The seed content was approximately 5-10 wt % of the mature pellet mass discharged from the bed. The data collected showed that the pellets had low pore volume (about 0.0009 to 0.0011 $cm^3/g$), small average pore diameter (about 6.54 to 6.65 nm) and very low porosity surface area (about 0.40 to 0.48 $m^2/$).

One goal of fluidized-bed reactive crystallizers is to improve the competition of solid precipitation onto pellets versus spontaneous nucleation (e.g., fines production). Factors that impact this may include the energy required for crystallization, relative supersaturation, and speed at which $CaOH_2$ dissolves. For example, less energy may be required for crystallization onto pellets/seeds than for spontaneous nucleation, so feeding and properly mixing the inflow chemical (NaOH or $Ca(OH)_2$) into a bed of pellets/seeds helps to reduce fines production. If the relative supersaturation is controlled and minimized at the feed point and/or where the calcium species dissociates in the presence of carbonate (e.g., distributed throughout the bed rather than all at the bottom of the bed), spontaneous nucleation is less likely to occur and instead crystal growth on the solid bed material is promoted. Further, if the speed at which $CaOH_2$ dissolves is too fast, it can create problems with local calcium carbonate supersaturation, especially in the entry zone.

Example implementations of systems and/or processes described herein feature the use of a fluidized-bed reactive crystallizer rather than a standard crystallizer vessel, and the process features a low carbonate conversion rate, tolerance for TSS in influent streams, high solution pH and slow dissolution of $Ca(OH)_2$ slurry.

The fluidized-bed reactive crystallizer may be different from a standard crystallizer vessel in that the fluidized-bed's upward flow of liquid suspends the solid bed and induces very high rates of mixing while retaining a higher bed density than a standard crystallizer. The high rates of mixing are required to prevent local calcium carbonate supersaturation at the point of $Ca(OH)_2$ addition which would lead to spontaneous nucleation and the production of small particles. The higher bed density results in significant solid bed mass surface area (e.g., consisting of growing pellets and/or seed material) per unit volume. The precipitation of a solid onto a surface requires less energy and is thus favored over spontaneous nucleation, but is often limited in standard crystallizers by the low amount of surface area per unit volume.

The high bed density in the fluidized-bed reactive crystallizer provides a relatively larger surface area for the calcium carbonate to precipitate onto, thus reducing the amount of spontaneous nucleation relative to a system which does not have a bed of solid material. This environment promotes growth of individual pellets having a major axis length of up to approximately 2 mm instead of the much smaller particles seen in standard crystallizers (major axis lengths of the individual particles produced in standard crystallizers are in the 5 to 100 micron range).

Example implementations of systems and/or processes described herein feature operation at higher effluent TSS levels, which are expected to produce poor reactor performance in lower pH (e.g., pH 7-10) systems. This is because it is typically expected that a higher TSS in the effluent is an indication that the calcium is nucleating and forming fines rather than precipitating on the bed mass and causing crystal growth, therefore retaining the calcium as part of the bed mass within the fluidized-bed reactive crystallizer. In example implementations of systems and/or processes described herein, the system can be operated at much higher effluent TSS, for example, between 500 ppm and 2000 ppm, rather than below 100 ppm as commonly seen in water softening and water treatment applications. For example, the systems and processes described herein may not follow the expected reduction in performance associated with high TSS content in the influent and instead may operate with higher TSS levels while achieving economically viable retention rates at calcium loading rates comparable to water treatment industries. For example, initial tests of the described systems and processes were run at much lower loading rates of about 2 $kg\text{-}Ca/m^2/hr$ in order to minimize effluent TSS to approximately 200 ppm in order, for instance, to maintain the high retention levels of about 84% to 93% seen in these initial tests. However, tests showed unexpected results in that calcium retention above 85% at effluent TSS levels of ~1400 ppm and a calcium loading rate of 15 $kg\text{-}Ca/m^2/hr$ were achieved. These results were unexpected but show that, while having potentially high TSS, example implementations of systems and/or processes described herein can still work at economically viable loading rates.

Example implementations of systems and/or processes described herein operate with high pH (for example, pH>14) where most of the $CO_2$ is present as carbonate ($CO_3$), and very little as bicarbonate ($HCO_3$). Other applications of fluidized-bed reactive crystallizers, such as seen in water treatment, operate at lower pH of approximately 8 to 10, and as such are dependent on the amount of bicarbonate and carbonate in the water, due to the nature of the bicarb-carb equilibrium reaction. This effects the relative calcium carbonate supersaturation within the vessel in a very different manner than when the pH is higher, for example above 12, as in example implementations of systems and/or processes described herein. Thus, the kinetics are different operating at the higher pH of the current application, and the governing resistances within the process are also different.

In some aspects depicted by FIG. 2, the systems and/or processes enable the use of a simple reactor design, for example, a spouted or cone fluidized-bed reactor. The slow dissolution rate of $Ca(OH)_2$ in example implementations of systems and/or processes described herein allow for the $Ca(OH)_2$ slurry to be added upstream of the solid bed mass, for example mixed into the influent solutions (e.g., recirculation and/or alkaline solution) upstream of the fluidized bed material. The spouted bed or cone fluidized-bed reactor design may be simpler, less expensive, and better suited for direct feed of a concentrated lime slurry when compared to systems designed to deal with chemical addition in applications where the chemical dissolution rates are much faster and where relative calcium carbonate supersaturation is more likely to occur.

In some aspects, the use of influent solution that is low in impurities consisting of, for example phosphates, phosphonates, Group II A ions, polyacrylic acid, iron, and magnesium, is preferred, as these impurities can inhibit the calcium carbonate growth rate or become included within the crystal structure, changing the crystal structure and properties. In some implementations, Group II A ions may include ions of elements Be, Mg, Ca, Sr, Ba, and Ra on the periodic table of elements. These elements are also often called alkaline-earth metals. These metals tend to lose two electrons to form $M_2+$ ions, such as $Ca_2+$, $Be_2+$, $Mg_2+$, etc. The amount of Group IIA ions brought into the process may be controlled, since these metal ions have the ability to compete with the intended $Ca_{2+}$ ions in the crystallization lattice causing changes to the pellet properties. These ions can also react to form salt compounds and, if incorporated into the pellet, may change the pellets physical and/or reactive properties, for example making the pellet softer and more prone to attrition. Other ions or additives could be selected which when included in the crystal lattice via the method above, will result in an increase in hardness of the macroscopic crystal, making it less prone to attrition.

Bivalent iron can attach itself into the calcium carbonate crystal structure, and due to its size difference from calcium carbonate, it can cause disruptions to the crystal structure, placing a strain on the crystal structure that leads to higher risk of attrition and fines. Phosphates can also act in a similar fashion, whereby they attach to the crystal and prevent further. In addition, some phosphonate compounds such as HEDP have been shown to inhibit calcium carbonate growth (e.g., used in the cooling tower/chiller industry to prevent scaling).

Additives (and for that matter impurities) may alter crystal nucleation and growth. Whether a given additive affects crystal nucleation (e.g., rather than crystal growth) can be determined by measuring the width of the metastable zone, which is widened by nucleation inhibitors. There may be several generic features of how additives and impurities can affect crystal nucleation. For example, to effectively inhibit crystal nucleation (e.g., fines formation), the additive should interact strongly with the solute (in this case calcium carbonate solid) and also have a structure that can disrupt the periodicity associated with the emerging crystal nucleus. These characteristics may ensure that the additive ends up within the aggregating crystals and that the crystals must disrupt their normal alignment in order to accommodate the additive molecule. This may help to disrupt the nucleation process and hence fines formation. An additive like the type described above could be selected such that it has a greater affinity to be included within the crystal structure of the calcium carbonate crystal aggregates than alkalis and therefore will occupy the spaces within the crystal structure which would normally be occupied by alkali.

The use of additives and/or operating conditions can also be used to promote growth of a certain shape of crystal, and/or a certain size of crystal which by its nature enforces a low porosity in the overall crystal aggregate. Additive features such as those mentioned above can be applied to the process described herein to make designer "fit for purpose" additives, as well as to minimize impurities such that the calcium carbonate pellets are produced as efficiently as possible (with minimum fines production) while still possessing optimum pellet properties (e.g., low porosity, hardness, low alkali content) for downstream processing.

In some aspects, additives may be added in a controlled fashion to alter physical properties of components within the process or kinetics of the process. For example, in one application, an additive such as nitrilotriacetic acid (NTA), phenol, sucrose, $NH_4Cl$ or H-EDTA may be added in controlled amounts to increase the dissolution rate of $Ca(OH)_2$. Increasing the dissolution rate of $Ca(OH)_2$ would enable the use of a shorter reactor vessel, since a shorter residence time within the solid bed mass would be required to dissolve the $Ca(OH)_2$ and then react the $Ca_{2+}$ ion to form $CaCO_3$.

In some aspects, an additive is added to the process in a controlled fashion to reduce the presence of low melting point salts contained with the pellets. In some applications, such as where the calcium carbonate crystal aggregates are sent to a calciner for further processing, the presence of low melting point salts in the calcium carbonate can cause fouling and operational issues in the calciner and downstream equipment. Examples of low melting point salts that may cause operational issues in downstream equipment are $Na_2CO_3$, $K_2CO_3$, NaOH, KOH, and chlorides.

In some aspects, an additive is added to the process in a controlled fashion to increase the hardness of the calcium carbonate crystal aggregates produced, such that attrition within the fluidized-bed reactive crystallizer and other downstream equipment such as conveyors is minimized.

In some aspects, an additive is added to the process in a controlled fashion to decrease the porosity of the calcium carbonate crystal aggregates produced, such that downstream dewatering and drying processes become simplified.

In some aspects, an additive is added to the process in a controlled fashion to decrease the viscosity of the $Ca(OH)_2$ slurry produced from the slaking process, allowing for lime slurry concentrations of greater than 30 wt % to be transported from the slaking unit at operating temperatures between 10° C. to 90° C. As an example, caustic potash (e.g., potassium hydroxide or KOH) or caustic soda (e.g., sodium hydroxide or NaOH) has a dispersant behaviour and when added to the slaking unit, it may act to reduce the $Ca(OH)_2$ slurry viscosity, thus enabling easier transportation.

Figure 4:
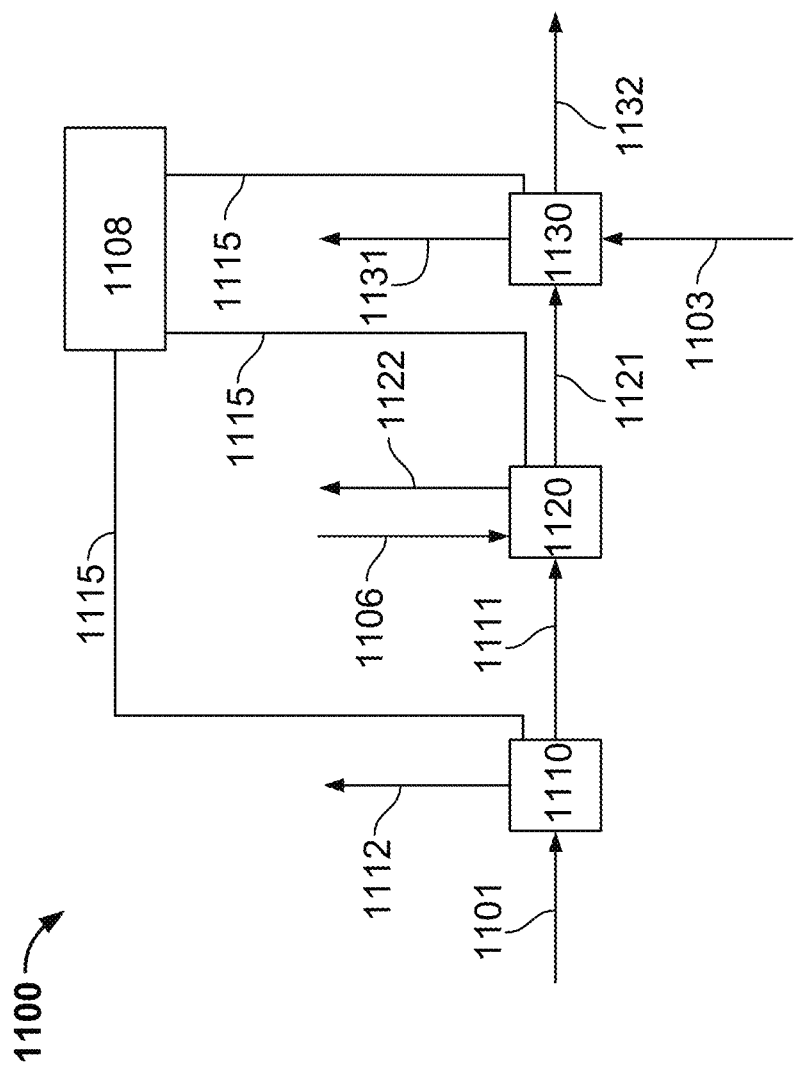
FIG. 4 illustrates an example process for growing calcium carbonate crystal aggregates while reducing the dissolved carbonate content and increasing the dissolved hydroxide content of the effluent liquid stream.

FIG. 4 illustrates an example process 1100 which continuously grows and processes calcium carbonate crystal aggregates by reacting the incoming $Ca(OH)_2$ slurry and the alkaline carbonate solution via the causticization reaction (reaction (2) above) to deposit a portion of the precipitated calcium carbonate ($CaCO_3$) onto the existing bed of solids causing the solids to grow in volume as well as reducing the dissolved carbonate content and increasing the hydroxide content of the liquid stream. As illustrated, the example process 1100 includes a unit 1110 (e.g., a slaker unit), a fluidized-bed reactive crystallizer 1120, a separation and washing station 1130, and a control system 1108.

The first step in this example process reacts calcium oxide with water to form calcium hydroxide in unit 1110 (e.g., an industrial lime slaker or lime hydrator coupled to a mixing tank wherein additional water is mixed with the $Ca(OH)_2$ produced from the hydrator) via reaction (1) above. The water used in this reaction can be either in the liquid or gaseous state. When the water is in a liquid state the reaction may be carried out in a mixed tank reactor, one example being industrial lime slakers, with an integral process of removing and disposing of un-reactable contaminants as stream 1112.

Stream 1101 of water fed into this device serves two purposes, first a portion of the water is consumed by the reaction to form the calcium hydroxide via reaction (1) and second an excess of water must be added to produce a transportable slurry of calcium hydroxide labelled as stream 1111. The properties of the calcium hydroxide slurry stream 1111 are selected and controlled to meet the requirements for the subsequent processing units. If the water in stream 1101 delivered to unit 1110 contains dissolved carbonate the produced calcium hydroxide will spontaneously react with these compounds, via reaction (2) above, in an uncontrolled manner to produce a precipitate of calcium carbonate. This precipitate will consist of particles each having a volume less than that of a 100 micron diameter sphere which is undesirable for the process described herein.

To reduce this uncontrolled reaction, at least 10 times more moles of calcium oxide should be supplied to this processing step than the moles of dissolved carbonate entering with the water as a part of stream 1101. In some aspects there will be control of the size of the $Ca(OH)_2$ particles produced in slaking unit 1110 and subsequently added to the fluidized-bed reactor 108. The control of $Ca(OH)_2$ particle size, and the related specific surface area, is used to optimize the overall process performance. Particle size can be controlled, either directly or indirectly, by the type of slaking system being used (e.g., a paste slaker, detention slaker, ball mill slaker, batch slaker, hydrator system), by the use of additives such as chlorides or by the control of operating parameters associated with the slaking unit.

Operating parameters such as the slaking temperature, lime (CaO) to water ratio, degree of agitation during slaking, viscosity of the slurry, slaking time, and water temperature can all affect the particle size, and/or the related specific surface area of the $Ca(OH)_2$ particles produced. The calcium carbonate supersaturation within the fluidized-bed reactive crystallizer may be controlled by the concentration of dissolved calcium. At steady state operation, for example, the calcium hydroxide loading to the reactor 108 is fixed, within a range of about 15 $kg\text{-}Ca/m^2/hr$ and 30 $kg\text{-}Ca\text{-}m^2/hr$. As such, changing the size of the influent $Ca(OH)_2$ solid particles may change the related particle surface area, which may alter the solid-solution interface leading to either faster or slower dissolution. This may also increase or decrease the risk of local supersaturation, respectively.

If the lime particles dissolve slower, this will decrease the risk of supersaturation but increase the required residence time in the fluidized solid bed mass to promote crystal growth onto the solid bed mass instead of into fines production outside of the bed. Larger $Ca(OH)_2$ particles in the slurry may also increase the risk of $Ca(OH)_2$ solids settling out of the slurry upstream of the fluidized-bed reactive crystallizer (in the slaking system and associated piping).

Once the calcium hydroxide slurry (stream 1111) is produced it is transferred to unit 1120 which grows calcium carbonate crystal aggregates by reacting the calcium hydroxide slurry with the dissolved carbonate content in liquid stream 1106 in a controlled manner via reaction (2). This reaction is carried out in a fluidized-bed reactive crystallizer, unit 1120, which has been optimized to operate in a high pH environment. The calcium hydroxide slurry of stream 1111 is metered into this device to control the rate at which calcium carbonate is formed and the device is arranged such that reaction (2) occurs in close proximity to growing calcium carbonate crystal aggregates.

As a result of controlling the rate of reaction (2) and the environment as reaction (2) occurs, calcium carbonate crystal aggregates, each having an average volume equivalent to spheres with diameters between 0.1 mm and 2 mm, are produced. The liquid from this equipment has had a portion of the dissolved carbonate precipitated out (reducing the dissolved carbonate concentration) and additional hydroxide dissolved in (increasing the dissolved hydroxide concentration), and the resulting liquid with its modified composition is discharged as the product hydroxide stream 1122 while the solid calcium carbonate crystal aggregates which have grown to the desired size are removed from the fluidized bed reactive crystallizer as a mixture of solution and calcium carbonate crystal aggregates and sent onward to the next processing step as stream 1121. Unit 1120 could be supplied with seed material to facilitate the growth of the solid calcium carbonate crystal aggregates. The seed material could be made by crushing or grinding a portion of the produced calcium carbonate crystal aggregates or supplied from an external source, such as limestone or sand or a designated seed fluidized-bed reactive crystallizer.

Due to the size, morphology, and physical properties of the calcium carbonate crystal aggregates in stream 1121 they can be easily separated from the solution in stream 1121, such that the accompanying solution after separation is less than 15% of the total weight of the calcium carbonate crystal aggregates, in unit 1130 using industrial separation equipment such as screens or spiral classifiers. The calcium carbonate crystal aggregates are then washed with stream 1103 which includes clean water and removes a majority of any residual solution on the calcium carbonate crystal aggregate surface. The solution and water removed in this processing step can both be delivered as part of the hydroxide stream 1131 or recycled back to the fluidized-bed reactive crystallizer or removed from the system altogether or delivered to the slaker as its required water input given it has low enough carbonate content. The calcium carbonate crystal aggregates which have now been separated from the hydroxide solution are sent as stream 1132 to an end user.

Process 1100 also includes a control system 1108 that is communicably coupled to at least one of the unit 1110 (e.g., slaker), the fluidized bed reactive crystallizer 1120, the separation and washing station 1130, through communication elements 1115. Implementations of the control system 1108 can include digital electronic circuitry, or computer software, firmware, or hardware, including the structures disclosed in this specification and their structural equivalents, or combinations of one or more of them. For example, the control system 1108 can be a microprocessor based controller (or control system) as well as an electro-mechanical based controller (or control system). Instructions and/or logic in the control system (e.g., to control the process 1100 or other processes implemented by the unit 1110 (e.g., slaker), the fluidized bed reactive crystallizer 1120, the separation and washing station 1130, can be implemented as one or more computer programs, e.g., one or more modules of computer program instructions, encoded on computer storage medium for execution by, or to control the operation of, data processing apparatus. Alternatively or in addition, the program instructions can be encoded on an artificially generated propagated non-transitory signal, e.g., a machine-generated electrical, optical, or electromagnetic signal that is generated to encode information for transmission to suitable receiver apparatus for execution by a data processing apparatus.

The control system 1108 can include clients and servers and/or master and slave controllers. A client and server are generally remote from each other and typically interact through a communication network. The relationship of client and server arises by virtue of computer programs running on the respective computers and having a client-server relationship to each other. In some aspects, the control system 1108 represents a main controller (e.g., master) communicably coupled through communication elements 1115 (e.g., wired or wireless) with each of the illustrated components of the process 1100.

Figure 5:
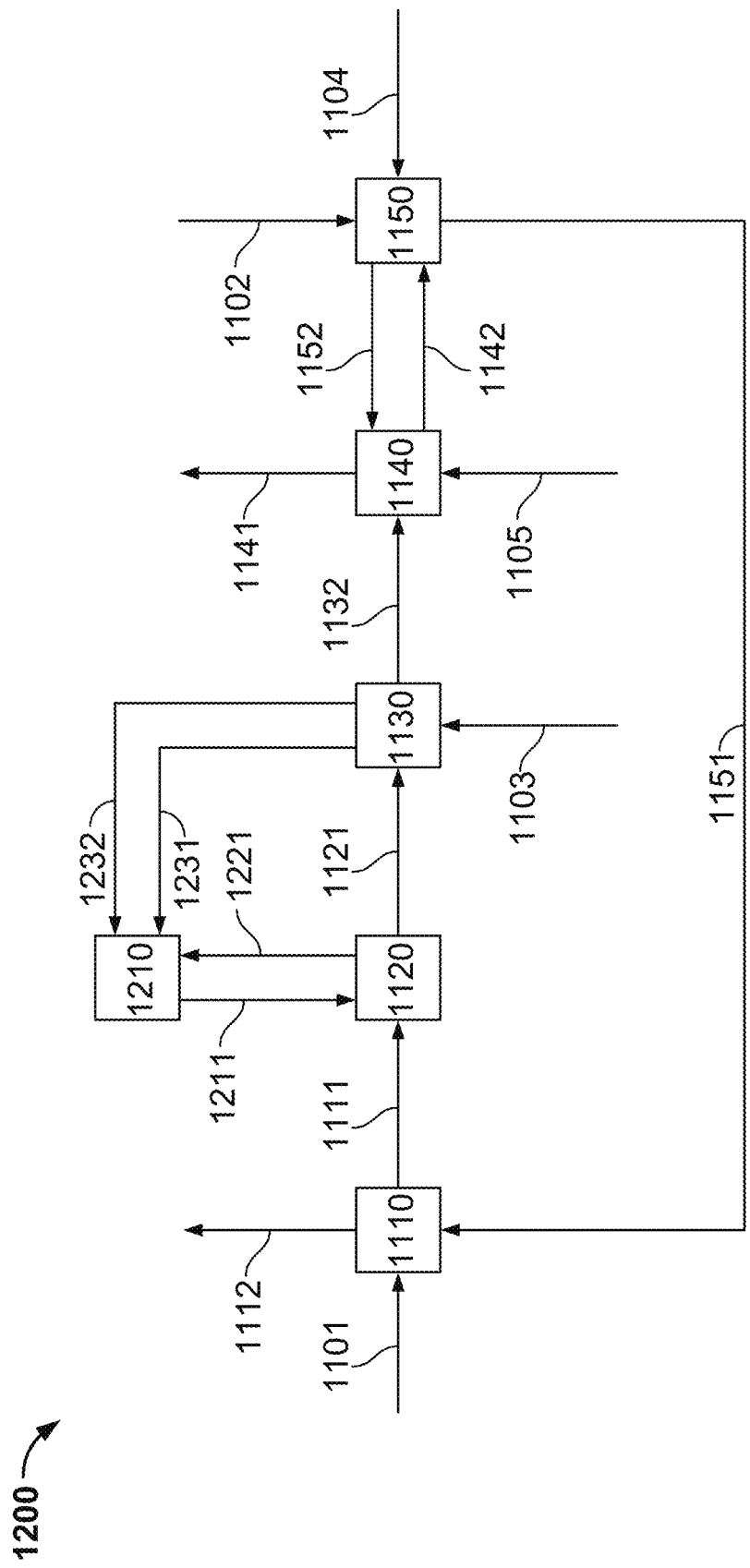
FIG. 5 illustrates an example process for growing and processing calcium carbonate crystal aggregates to convert clarified green liquor from a pulp plant to clarified white liquor.

FIG. 5 illustrates an example process 1200 for growing and processing calcium carbonate crystal aggregates in a solution environment consisting of effluent (known as green liquor) from a pulp plant, and as a result of the causticization reaction occurring, reducing the dissolved carbonate content and increasing the dissolved hydroxide content of the liquid stream and delivering the resulting stream to the pulp plant as clarified white liquor. Process 1200, as illustrated, includes a pulp plant 1210 in material communication with the fluidized bed reactive crystallizer 1120, and the separation and washing unit 1130. Further, process 1200 includes, in the illustrated implementation, the unit 1110 (e.g., slaker), the dryer 1140, and calciner 1150

In the illustrated process 1200, the pulp plant unit 1210 uses clarified white liquor stream 1221 from fluidized bed reactive crystallizer 1120 and clarified white liquor stream 1231 from unit 1130 to process or cook wood chips during the pulp making process. The caustic wash water stream 1232 from separation and washing unit 1130 may be combined with the black liquor in the pulp plant 1210 to produce carbonate rich green liquor stream 1211 which is supplied to the fluidized bed reactive crystallizer unit 1120. Therefore, in some aspects, the process provides at least clarified white liquor to the pulp plant, and in turn the process receives the carbonate rich green liquor from the pulp plant.

In some aspects, the slaking unit 1110 as employed in this embodiment operates in the same or similar manner, using the same or similar input material streams and outputting the same or similar materials as shown in FIG. 1 and described in the first embodiment.

Once the calcium hydroxide slurry (stream 1111) is produced it is transferred to unit 1120 which grows calcium carbonate crystal aggregates by reacting the calcium hydroxide slurry with the green liquor stream 1211 discharged from the pulp plant unit 1210. The calcium hydroxide reacts with the dissolved carbonate content of stream 1211 in a controlled manner via reaction (2). This reaction is carried out in a fluidized bed reactive crystallizer which has been optimized to operate in a high pH environment. The calcium hydroxide slurry of stream 1111 is metered into this device to control the rate at which calcium carbonate is formed and the device is arranged such that reaction (2) occurs in close proximity to growing calcium carbonate crystal aggregates. As a result of controlling the rate of reaction (2) and the environment as reaction (2) occurs, calcium carbonate crystal aggregates with average volumes equivalent to spheres with diameters between 0.1 mm and 2 mm are produced. The liquid from this equipment has had a portion of the carbonate precipitated out (reducing the dissolved carbonate concentration) and additional hydroxide dissolved in (increasing the dissolved hydroxide concentration), and the resulting liquid with its modified composition is discharged back to the Pulp Plant unit 1210 as the product clarified white liquor stream 1221 while the solid calcium carbonate crystal aggregates which have grown to the desired size are removed from the fluidized bed reactive crystallizer as a mixture of solution and calcium carbonate crystal aggregates and sent onward to the next processing step as stream 1121.

Due to the size, morphology, and physical properties of the calcium carbonate crystal aggregates in stream 1121 they can be almost completely separated from the solution in stream 1121, such that the accompanying solution after separation is less than 15% of the total weight of the calcium carbonate crystal aggregates, in unit 1130 using industrial separation equipment such as screens or spiral classifiers. The undiluted hydroxide solution is sent back to the Pulp Plant (unit 1120) as stream 1231 and has similar properties to clarified white liquor in the pulping process. The calcium carbonate crystal aggregates are then washed with stream 1103 which consists of clean water and removes a majority of any residual solution on the calcium carbonate crystal aggregate surface. The spent caustic wash water (stream 1232) is also sent back to the Pulp plant (unit 1210), to be used to dissolve the black liquor and form green liquor. The solution and water removed in this processing step could instead be recycled back to the fluidized bed reactive crystallizer unit 1120. The calcium carbonate crystal aggregates which have now been washed and separated from the hydroxide solution are sent as stream 1132 to a system such as a calciner which is designed to convert them from $CaCO_3$ to CaO which can be reused in the slaker unit 1110. The pellets produced by this process have physical properties and characteristics, such as size, low porosity, low alkali content, which are preferable to lime mud and enable the use of more efficient and/or low cost calcination equipment.

Figure 6:
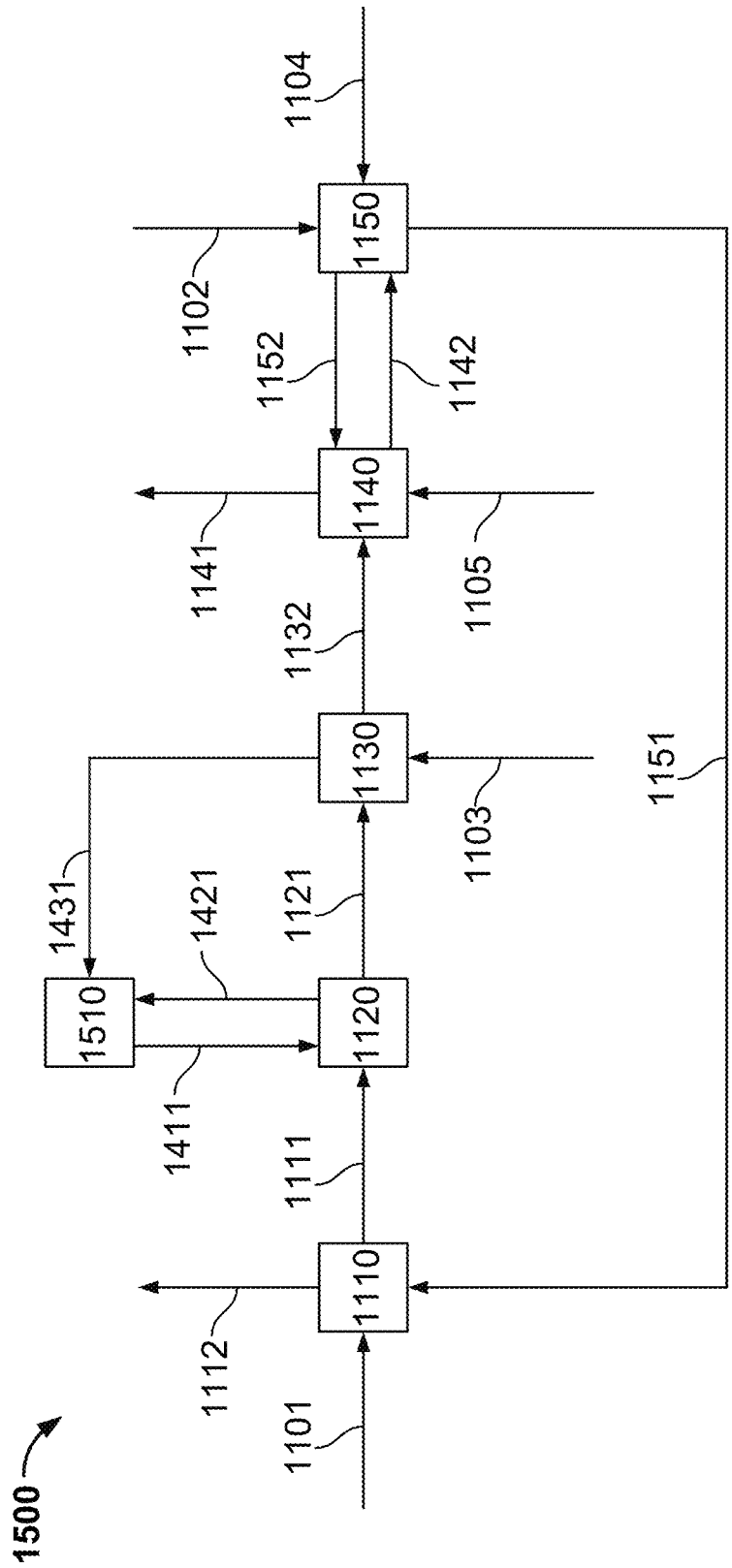
FIG. 6 illustrates an example process for growing calcium carbonate crystal aggregates while reducing the dissolved carbonate content and increasing the dissolved hydroxide content of the effluent liquid in an air-capture plant, in association with an air-fired or oxygen-fired calciner, and $CO_2$ capture, and gas absorber.

FIG. 6 illustrates an example process 1500 for growing and processing calcium carbonate crystal aggregates by reacting the incoming $Ca(OH)_2$ slurry and the alkaline carbonate solution via the causticization reaction (reaction (2) above) to deposit a portion of the precipitated calcium carbonate ($CaCO_3$) onto the existing bed of solids causing the solids to grow in volume as well as reducing the dissolved carbonate content and increasing the hydroxide content of the liquid stream as applied in the process of capturing $CO_2$ from atmospheric air. Process 1500, as illustrated, includes a gas absorber or air-absorber or air-contactor 1510 in material communication with the fluidized bed reactive crystallizer 1120 and the separation and washing station 1130. Further, process 1500 includes, in the illustrated implementation, the unit 1110 (e.g., slaker), the dryer 1140, and calciner 1150.

In the illustrated process 1500, the gas absorber unit 1510 absorbs a fraction of $CO_2$ from atmospheric air using a combination of $CO_2$-lean solution stream 1421 from the fluidized bed reactive crystallizer 1120 and dilute $CO_2$-lean stream 1431 from separation and washing unit 1130. After the absorption of $CO_2$, the gas absorber returns the resulting $CO_2$-rich stream 1411 to unit 1120. Therefore, in one aspect, at least $CO_2$-lean solution may be provided to the gas absorber, and the process in-turn receives the $CO_2$ rich solution from the gas absorber.

In the illustrated process 1500, in association with a calciner, $CO_2$ capture, and a gas absorber is illustrated. In some aspects, the slaking unit 1110 as employed in this embodiment operates in the same or similar manner, using the same or similar input material streams and outputting the same or similar materials as shown in FIG. 4 and described in the first embodiment.

Once the calcium hydroxide slurry (stream 1111) is produced it is transferred to unit 1120 which grows calcium carbonate aggregates by reacting the calcium hydroxide slurry with the $CO_2$-rich stream 1411 discharged from the air or gas absorber unit 1510. The calcium hydroxide reacts with a portion of the dissolved carbonate content of stream 1411 in a controlled manner via reaction (2). This reaction is carried out in a fluidized bed reactive crystallizer which has been optimized to operate in a high pH environment. The calcium hydroxide slurry of stream 1111 is metered into this device to control the rate at which calcium carbonate is formed and the device is arranged such that the reaction to form the calcium carbonate occurs in close proximity to growing calcium carbonate crystal aggregates.

As a result of controlling the rate of reaction (2) and the environment as reaction (2) occurs calcium carbonate crystal aggregates with average volumes equivalent to spheres with diameters between 0.1 mm to 2 mm are produced. The liquid from this equipment has had a portion of the carbonate precipitated out (reducing the dissolved carbonate concentration) and additional hydroxide dissolved in (increasing the dissolved hydroxide concentration), and the resulting liquid with its modified composition is discharged back to the air or gas absorber unit 1510 as the $CO_2$-lean stream 1421 while the solid calcium carbonate crystal aggregates which have grown to the desired size are removed from the fluidized bed reactive crystallizer as a mixture of solution and calcium carbonate crystal aggregates and sent onward to the next processing step as stream 1121.

Due to the size, morphology, and physical properties of the calcium carbonate crystal aggregates in stream 1121 they can be almost completely separated from the solution in stream 1121, such that the accompanying solution after separation is less than about 15% of the total weight of the calcium carbonate crystal aggregates, in unit 1130 using industrial separation equipment such as screens or spiral classifiers. The calcium carbonate crystal aggregates are then washed with stream 1103 which includes clean water and removes a majority of any residual solution on the calcium carbonate crystal aggregate surface. Both the spent caustic wash water and the undiluted hydroxide solution are mixed and sent back to the gas absorber unit 1510 as the $CO_2$-lean stream 1431. The solution and water removed in this processing step can both be delivered back to the gas absorber unit 1510 or recycled back to the fluidized bed reactive crystallizer unit 1120. The calcium carbonate crystal aggregates which have now been washed and separated from the hydroxide solution are sent as stream 1132 to a drying unit 1140 which vaporizes any residual moisture.

The calcium carbonate crystal aggregates in this process carry very little water on their surface after they are separated from solution in unit 1130 and are then processed by a drying unit 1140 to remove this residual moisture. The residual moisture, in either liquid or vapour phase, is discharged from the process as a portion of stream 141. Due to the size and morphology of the crystal aggregates, fluidized bed dryers can be employed as unit 1140 which can make use of heat supplied using advanced drying processes like super-heated steam dryers, vapour recompression dryers, and in bed heat exchange tubes. Specifically, fluidized bed dryers could operate on low grade heat which could be below or only slightly above 100° C., hot gases from other points in the process, or in the case of vapour recompression systems, electrical energy drives a heat pump which could deliver up to 60 kJ of heat by consuming 1 kJ of electricity. Alternatively, the dryer 1140 may be a contact dryer such as, for example, vacuum tray, vertical agitated, double cone, horizontal pan, plate, vacuum band, horizontal, paddle or indirect rotary dryers. The dryer 1140 may also be a dispersion convective dryer other than a fluidized bed dryer, such as spouted bed, direct rotary and pneumatic conveying dryers, or layer convective dryers such as convective tray, through-circulation, turbo-tray, tunnel, moving bed, paddle, or a rotary-louver dryer.

In addition to the calcium carbonate crystal aggregates in stream 1132, stream 1105 of make-up calcium carbonate is introduced into drying unit 1140 to account for losses of calcium compounds throughout the process. The source of make-up calcium carbonate could be limestone. Stream 142 of dry calcium carbonate crystal aggregates and make-up calcium carbonate are now ready for the final processing step.

The calcium carbonate crystal aggregates are then reacted to reform the calcium oxide which was used in the first step in the process and release a gas stream containing $CO_2$ via reaction (3) above. This reaction takes place at approximately 900° C., requires heat energy as an input, and is carried out in unit 1150, commonly known as calciner. The heat could be supplied to the calciner by the combustion of hydrocarbons such as natural gas, fuel oil, or coal, biomass, the use of solar heat, electricity, or a combination thereof.

The calciner (e.g., unit 1150) employed could be a rotary kiln, shaft kiln, flash calciner, or fluidized bed calciner. In some embodiments, the necessary heat is supplied when stream 104 of fuel is combusted with the oxygen in gas stream 102 which could consist of air or oxygen from an air separation unit (ASU). The products from combustion of fuel and the $CO_2$ from reaction (3) mix together and are discharged from calcining unit 1150 as off-gases 1152. The washing previously described and only achievable with the calcium carbonate crystal aggregates enables the use of fluidized bed calciners, which are desirable because they are inherently easy to control and have very uniform internal conditions, both are factors which lead to more reactive CaO in stream 1151 with less material which has been over heated, over-burnt or sintered and of which must be disposed. Stream 1151 is returned to unit 1110 such that the process can be repeated. Stream 1152 of off-gases are hot and could be used to preheat streams 102, 104, or 142 before they enter the calcination unit 1150, as the heat source for drying unit 1140, or to generate steam in a boiler. Stream 1152 can be applied to these various processes because a majority of the solution was removed in unit 1130, and the size and morphology of the calcium carbonate crystal aggregates prevents contamination of stream 1152 with unmanageable quantities of dust from stream 142 or steam 1151 or chemicals from stream 1121. Once the heat in stream 1152 has been used as described above the resultant gases could be delivered to a consumer of $CO_2$ enriched air such as a greenhouse or algaculture facility or in the case where stream 102 consisted of oxygen from an air separation unit stream 1152 is primarily $CO_2$ and can be delivered to a user of $CO_2$ such an enhanced oil recovery field.

A number of implementations have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Further, in some implementations, one or more processes disclosed here, may be performed with additional steps, fewer steps, or may be performed in different orders than those disclosed herein, within the scope of the present disclosure. As another example, although a control system (e.g., control system 1108) is not illustrated as part of every disclosed process and/or system, each of the aforementioned processes (e.g., systems 200 and 300 and otherwise) may include a control system or a controller (e.g., similar to controller 110 and/or control system 1108) communicably coupled to the components (illustrated or otherwise) and configured to perform operations and/or execute instructions to implement such processes (and other processes). Accordingly, other implementations are within the scope of the following claims.

What is claimed is:
1. A pellet reactor, comprising:
a body extending between a top and a bottom and defining an enclosure for housing a bed of solid particles, the body comprising:
at least one input configured to receive calcium hydroxide and an alkaline carbonate solution to fluidize the bed of solid particles, part of the enclosure forming a reaction zone in which the calcium hydroxide is received at a loading rate between 20 kg-Ca/m$^2$/h and 30 kg-Ca/m$^2$/h and reacted with the alkaline carbonate solution to precipitate calcium carbonate and deposit a portion of a precipitated calcium carbonate onto the bed of solid particles to form mature pellets of calcium carbonate; and an output configured to discharge the mature pellets of calcium carbonate upon the mature pellets of calcium carbonate achieving a volume between about 0.0005 mm and about 5 mm$^3$.

2. The pellet reactor of claim 1, further comprising a recirculation line extending from the top of the body toward the bottom of the body, the recirculation line having an outlet in fluid communication with the enclosure, the recirculation line configured to flow the alkaline carbonate solution from the top of the body to the bottom of the body to fluidize the bed of solid particles.

3. The pellet reactor of claim 1, wherein the at least one input includes a first input configured to receive the calcium hydroxide and a second input configured to receive the alkaline carbonate solution.

4. The pellet reactor of claim 1, wherein the at least one input includes a single input configured to receive both the calcium hydroxide and the alkaline carbonate solution.

5. The pellet reactor of claim 1, wherein the at least one input is configured to receive a slurry of calcium hydroxide.

6. The pellet reactor of claim 5, further comprising at least one injection device configured to introduce the slurry of calcium hydroxide directly into the bed of solid particles.

7. The pellet reactor of claim 6, wherein the at least one injection device is configured to inject the slurry of calcium hydroxide through a horizontal cross-sectional area of the bed of solid particles.

8. The pellet reactor of claim 6, wherein the at least one injection device comprises at least one lance or at least one nozzle that extends into the enclosure at an angle.

9. The pellet reactor of claim 8, wherein:
the at least one injection device comprises the at least one lance; and
the at least one lance includes a main trunk and a plurality of branches that angularly extend from the main trunk within the enclosure.

10. The pellet reactor of claim 5, wherein the enclosure is configured to receive the slurry of calcium hydroxide and the alkaline carbonate solution at a calcium to carbonate molar ratio in a range of 1.1:1 to 30:1.

11. The pellet reactor of claim 5, wherein:
the at least one input is configured to receive the slurry of calcium hydroxide at an influent flow rate;
the body is configured to recirculate a portion of the alkaline carbonate solution to the at least one input at a recirculation flow rate; and
a ratio of the recirculation flow rate over the influent flow rate ranges from 19:1 to 50:1.

12. The pellet reactor of claim 1, wherein the at least one input is configured to receive the calcium hydroxide together with the alkaline carbonate solution.

13. A system for capturing carbon dioxide directly from atmospheric air, the system comprising:
an air contactor configured to capture the carbon dioxide from the atmospheric air and to form an alkaline carbonate solution that comprises hydroxide and carbonate;
a pellet reactor comprising:
a body extending between a top and a bottom and defining an enclosure for housing a bed of solid particles, the body comprising:
at least one input configured to receive calcium hydroxide, the at least one input in fluid communication with the air contactor to receive the alkaline carbonate solution to fluidize the bed of solid particles, part of the enclosure forming a reaction zone in which the calcium hydroxide is reacted with the alkaline carbonate solution to precipitate calcium carbonate and deposit a portion of a precipitated calcium carbonate onto the bed of solid particles to form mature pellets of calcium carbonate; and
an output configured to discharge at least the mature pellets of calcium carbonate upon the mature pellets of calcium carbonate each achieving a volume between about 0.0005 mm$^3$ and about 5 mm$^3$; and
a calciner configured to receive at least some of the mature pellets of calcium carbonate from the pellet reactor and calcine the at least some of the mature pellets of calcium carbonate.

14. The system of claim 13, further comprising a dryer configured to:
receive the at least some of the mature pellets of calcium carbonate from the pellet reactor;
reduce a moisture content of the at least some of the mature pellets of calcium carbonate to form drier mature pellets of calcium carbonate; and
provide the drier mature pellets of calcium carbonate to the calciner.

15. The system of claim 14, further comprising a separation and washing station fluidly coupled to the pellet reactor, the separation and washing station configured to wash the mature pellets of calcium carbonate discharged from the output of the pellet reactor with the alkaline carbonate solution and provide a washed mature pellets stream comprising less than 15 wt % moisture content to the dryer.

16. The system of claim 13, further comprising:
a grinding system configured to receive at least some of the mature pellets of calcium carbonate discharged from the pellet reactor and grind the at least some of the mature pellets of calcium carbonate into a seed material; and
the at least one input configured to receive the seed material.

17. The system of claim 13, further comprising a slaker configured to yield a slurry of calcium hydroxide that comprises between 2 wt % and 40 wt % calcium hydroxide, wherein the slurry of calcium hydroxide is transferred to the at least one input of the pellet reactor at a loading rate between 5 kg-Ca/m$^2$/h to 35 kg-Ca/m$^2$/h.

18. The system of claim 13, wherein the pellet reactor includes a recirculation line extending from the top of the body toward the bottom of the body, the recirculation line having an outlet in fluid communication with the enclosure, the recirculation line configured to flow the alkaline carbonate solution from the top of the body to the bottom of the body.

19. The system of claim 13, wherein the calciner is configured to calcine the at least some of the mature pellets of calcium carbonate to form a calcium oxide product stream.

20. The system of claim 13, wherein the calciner is configured to calcine the at least some of the mature pellets of calcium carbonate to form a calcium dioxide product stream for a user of carbon dioxide.

* * * * *

UNITED STATES PATENT AND TRADEMARK OFFICE
CERTIFICATE OF CORRECTION

| | | |
|---|---|---|
| PATENT NO. | : 12,054,399 B2 | Page 1 of 1 |
| APPLICATION NO. | : 18/137150 | |
| DATED | : August 6, 2024 | |
| INVENTOR(S) | : Kenton Robert Heidel et al. | |

It is certified that error appears in the above-identified patent and that said Letters Patent is hereby corrected as shown below:

In the Claims

Column 27, Line 3-4, Claim 1, delete "0.0005 mm" and insert -- 0.0005 $mm^3$ --.

Signed and Sealed this
Eighth Day of October, 2024

Katherine Kelly Vidal
*Director of the United States Patent and Trademark Office*